United States Patent
Oliver et al.

(10) Patent No.: US 10,278,027 B2
(45) Date of Patent: Apr. 30, 2019

(54) TARGETED ALERT SYSTEM WITH LOCATION-BASED AND ROLE-BASED ALERT DISTRIBUTION

(71) Applicant: Johnson Controls Technology Company, Milwaukee, WI (US)

(72) Inventors: Alma Liseth Oliver, Mission Hills, CA (US); Akhila Kancharla, Simi Valley, CA (US); Ozgur Aral, Newbury Park, CA (US); Deepa Balakrishnan, Moorpark, CA (US); Wiley B. Gilreath, Simi Valley, CA (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 15/583,860

(22) Filed: May 1, 2017

(65) Prior Publication Data
US 2017/0352257 A1     Dec. 7, 2017

Related U.S. Application Data

(60) Provisional application No. 62/330,854, filed on May 3, 2016.

(51) Int. Cl.
| | |
|---|---|
| *G08B 25/10* | (2006.01) |
| *G08B 27/00* | (2006.01) |
| *H04W 4/04* | (2009.01) |
| *G08B 19/00* | (2006.01) |
| *G08B 21/02* | (2006.01) |

(52) U.S. Cl.
CPC .............. *H04W 4/04* (2013.01); *G08B 25/10* (2013.01); *G08B 27/005* (2013.01); *G08B 19/005* (2013.01); *G08B 21/0272* (2013.01); *G08B 27/001* (2013.01)

(58) Field of Classification Search
CPC .... G08B 25/10; G08B 25/005; G08B 25/014; G08B 27/001; G08B 7/066; G08B 17/00; G08B 21/02; G08B 13/02; G08B 21/22; G08B 19/00; G08B 25/00; G08B 25/007; H04L 12/282; H04L 12/2818; H04L 43/0817; H04L 67/18; H04L 67/206; H04L 2012/2841; H04W 4/001; H04W 4/008;
(Continued)

(56) References Cited

U.S. PATENT DOCUMENTS

| | | | | |
|---|---|---|---|---|
| 8,400,268 B1 * | 3/2013 | Malik | ..................... | G06Q 10/06 340/539.12 |
| 8,494,481 B1 * | 7/2013 | Bacco | .................. | G08B 25/005 455/404.1 |

(Continued)

*Primary Examiner* — Adnan Aziz
(74) *Attorney, Agent, or Firm* — Foley & Lardner LLP

(57) ABSTRACT

A system for distributing targeted alerts to building occupants includes building equipment and a targeted alert system. The building equipment are configured to detect an event within a building and generate an alert identifying the event. The targeted alert system is configured to receive the alert from the building equipment, identify a location within the building of each of a plurality of building occupants, identify a role performed by each of the plurality of building occupants, select one or more of the building occupants to receive the alert based on at least one of the location of each building occupant and the role performed by each building occupant, and distribute the alert to the selected building occupants.

18 Claims, 11 Drawing Sheets

(58) Field of Classification Search
CPC ..... H04W 4/021; H04W 4/023; H04W 4/028; H04W 4/043; H04W 4/90; G06Q 90/02
USPC .................................................. 340/539.13
See application file for complete search history.

(56) References Cited

U.S. PATENT DOCUMENTS

| | | | | |
|---|---|---|---|---|
| 9,541,625 B2* | 1/2017 | McSheffrey | ............. | G01S 1/02 |
| 9,575,477 B2* | 2/2017 | Blount | .................. | G05B 15/02 |
| 9,652,975 B1* | 5/2017 | Riley | .................. | A01K 15/021 |
| 9,836,944 B2* | 12/2017 | Hwang | .................. | H04W 4/90 |
| 2004/0172277 A1* | 9/2004 | Dione | .................. | G06Q 30/02 |
| | | | | 705/324 |
| 2005/0197775 A1* | 9/2005 | Smith | .................. | G08B 21/10 |
| | | | | 702/3 |
| 2006/0208888 A1* | 9/2006 | Patel | .................. | G07C 9/00111 |
| | | | | 340/572.1 |
| 2006/0226970 A1* | 10/2006 | Saga | .................. | G08B 7/066 |
| | | | | 340/506 |
| 2009/0146832 A1* | 6/2009 | Ebert | .................. | G06K 17/00 |
| | | | | 340/8.1 |
| 2010/0106318 A1* | 4/2010 | Grohman | .................. | H04L 12/2818 |
| | | | | 700/276 |
| 2010/0114383 A1* | 5/2010 | Rosca | .................. | H04W 16/20 |
| | | | | 700/276 |
| 2010/0190479 A1* | 7/2010 | Scott | .................. | G06F 17/289 |
| | | | | 455/414.1 |
| 2010/0315228 A1* | 12/2010 | Grilliot | .................. | G08B 21/04 |
| | | | | 340/540 |
| 2011/0071685 A1* | 3/2011 | Huneycutt | .................. | G05B 15/02 |
| | | | | 700/275 |
| 2011/0087988 A1* | 4/2011 | Ray | .................. | G06Q 10/06 |
| | | | | 715/771 |
| 2011/0115816 A1* | 5/2011 | Brackney | .................. | G06Q 10/06 |
| | | | | 345/629 |
| 2011/0117878 A1* | 5/2011 | Barash | .................. | H04W 4/90 |
| | | | | 455/404.2 |
| 2012/0047083 A1* | 2/2012 | Qiao | .................. | A62C 99/009 |
| | | | | 705/325 |
| 2012/0072106 A1* | 3/2012 | Han | .................. | G01S 5/0252 |
| | | | | 701/410 |
| 2013/0054033 A1* | 2/2013 | Casilli | .................. | H04L 12/282 |
| | | | | 700/276 |
| 2013/0169681 A1* | 7/2013 | Rasane | .................. | G06T 19/006 |
| | | | | 345/633 |
| 2013/0191019 A1* | 7/2013 | Pakzad | .................. | G01C 21/206 |
| | | | | 701/454 |
| 2014/0279210 A1* | 9/2014 | Cooney | .................. | G06Q 30/0633 |
| | | | | 705/26.8 |
| 2014/0289321 A1* | 9/2014 | Fata | .................. | G05B 15/02 |
| | | | | 709/203 |
| 2014/0320282 A1* | 10/2014 | Zhang | .................. | G08B 7/066 |
| | | | | 340/502 |
| 2014/0365390 A1* | 12/2014 | Braun | .................. | G06Q 50/265 |
| | | | | 705/325 |
| 2014/0368601 A1* | 12/2014 | deCharms | .................. | H04W 4/021 |
| | | | | 348/14.02 |
| 2015/0022348 A1* | 1/2015 | Hwang | .................. | G08B 25/10 |
| | | | | 340/539.13 |
| 2015/0116106 A1* | 4/2015 | Fadell | .................. | G08B 19/005 |
| | | | | 340/501 |
| 2015/0142898 A1* | 5/2015 | Piccolo, III | .................. | G08B 17/00 |
| | | | | 709/206 |
| 2015/0178865 A1* | 6/2015 | Anderson | .................. | G05B 17/02 |
| | | | | 705/7.25 |
| 2015/0287310 A1* | 10/2015 | Deliuliis | .................. | G08B 21/10 |
| | | | | 340/628 |
| 2015/0310730 A1* | 10/2015 | Miller | .................. | G08B 27/001 |
| | | | | 340/539.13 |
| 2015/0312696 A1* | 10/2015 | Ribbich | .................. | H04W 4/001 |
| | | | | 455/418 |
| 2016/0047663 A1* | 2/2016 | Iyer | .................. | G01C 21/3415 |
| | | | | 701/411 |
| 2016/0192166 A1* | 6/2016 | deCharms | .................. | H04W 4/021 |
| | | | | 348/14.02 |
| 2017/0024839 A1* | 1/2017 | Klein | .................. | H04W 4/90 |
| 2017/0278378 A1* | 9/2017 | Kaplita | .................. | H04W 4/90 |

* cited by examiner

TARGETED ALERT SYSTEM WITH LOCATION-BASED AND ROLE-BASED ALERT DISTRIBUTION

CROSS-REFERENCE TO RELATED PATENT APPLICATION

This application claims the benefit of and priority to U.S. Provisional Patent Application No. 62/330,854 filed May 2, 2016, the entire disclosure of which is incorporated by reference herein.

BACKGROUND

The present disclosure relates generally to an automated alert system for a building, and more particularly to a targeted alert system with location-based and role-based alert distribution.

SUMMARY

One implementation of the present disclosure is a system for distributing targeted alerts to building occupants. The system includes building equipment and a targeted alert system. The building equipment are configured to detect an event within a building and generate an alert identifying the event. The targeted alert system is configured to receive the alert from the building equipment, identify a location within the building of each of a plurality of building occupants, identify a role performed by each of the plurality of building occupants, select one or more of the building occupants to receive the alert based on at least one of the location of each building occupant and the role performed by each building occupant, and distribute the alert to the selected building occupants.

In some embodiments, the system includes a locations database configured to store location information indicating the location within the building of each of the plurality of building occupants. In some embodiments, the targeted alert system is configured to identify the location within the building of each building occupant by accessing the location information in the locations database.

In some embodiments, the system includes a roles database configured to store role information indicating the role performed by each of the plurality of building occupants. In some embodiments, the targeted alert system is configured to identify the role performed by each building occupant by accessing the role information in the roles database.

In some embodiments, the targeted alert system is configured to select the one or more building occupants to receive the alert by identifying one or more roles associated with the event and selecting one or more of the building occupants that perform the identified roles.

In some embodiments, the targeted alert system is configured to select the one or more building occupants to receive the alert by identifying a location within the building at which the event occurs and selecting one or more of the building occupants based on a distance between the location at which the event occurs and the location of each building occupant.

In some embodiments, the targeted alert system is configured to select the one or more building occupants to receive the alert by identifying one or more of the building occupants having a role associated with responding to the event, determining a distance between the location at which the event occurs and the location of each identified building occupant, and selecting the identified building occupant that has a minimum distance between the location at which the event occurs and the location of the identified building occupant.

In some embodiments, the targeted alert system is configured to select the one or more building occupants to receive the alert by determining a location of the building equipment, determining a distance between the location of the building equipment and the location of each identified building occupant, and selecting one or more of the building occupants within a threshold distance of the location of the building equipment.

In some embodiments, the targeted alert system is configured to select the one or more building occupants to receive the alert by identifying one or more of the building occupants having a role associated with the event, determining whether each of the identified building occupants is located within the building, and selecting the identified building occupants that are determined to be located within the building.

In some embodiments, the system includes a plurality of wireless emitters. Each of the wireless emitters may have a known location within the building. In some embodiments, the targeted alert system is configured to determine the location within the building of each building occupant based on which of the wireless emitters are detected by a mobile device carried by the building occupant.

In some embodiments, the targeted alert system is configured to determine the location within the building of each building occupant based on location information measured by a mobile device carried by the building occupant.

Another implementation of the present disclosure is a method for distributing targeted alerts to building occupants. The method includes receiving an alert identifying an event within a building, identifying a location within the building of each of a plurality of building occupants, identifying a role performed by each of the plurality of building occupants, selecting one or more of the building occupants to receive the alert based on at least one of the location of each building occupant and the role performed by each building occupant, and distributing the alert to the selected building occupants.

In some embodiments, the method includes storing location information within a locations database. The location information may indicate the location within the building of each of the plurality of building occupants. Identifying the location within the building of each building occupant may include accessing the location information in the locations database.

In some embodiments, the method includes storing role information within a roles database. The role information may indicate the role performed by each of the plurality of building occupants. Identifying the role performed by each building occupant may include accessing the role information in the roles database.

In some embodiments, selecting the one or more building occupants to receive the alert includes identifying one or more roles associated with the event and selecting one or more of the building occupants that perform the identified roles.

In some embodiments, selecting the one or more building occupants to receive the alert includes identifying a location within the building at which the event occurs and selecting one or more of the building occupants based on a distance between the location at which the event occurs and the location of each building occupant.

In some embodiments, selecting the one or more building occupants to receive the alert includes identifying one or more of the building occupants having a role associated with responding to the event, determining a distance between the location at which the event occurs and the location of each identified building occupant, and selecting the identified building occupant that has a minimum distance between the location at which the event occurs and the location of the identified building occupant.

In some embodiments, selecting the one or more building occupants to receive the alert includes determining a location of the building equipment, determining a distance between the location of the building equipment and the location of each identified building occupant, and selecting one or more of the building occupants within a threshold distance of the location of the building equipment.

In some embodiments, selecting the one or more building occupants to receive the alert includes identifying one or more of the building occupants having a role associated with the event, determining whether each of the identified building occupants is located within the building, and selecting the identified building occupants that are determined to be located within the building.

In some embodiments, the method includes identifying a location of each of a plurality of wireless emitters within the building and determining the location within the building of each building occupant based on which of the wireless emitters are detected by a mobile device carried by the building occupant.

In some embodiments, the method includes determining the location within the building of each building occupant based on location information measured by a mobile device carried by the building occupant.

DETAILED DESCRIPTION

Overview

Figure 1:
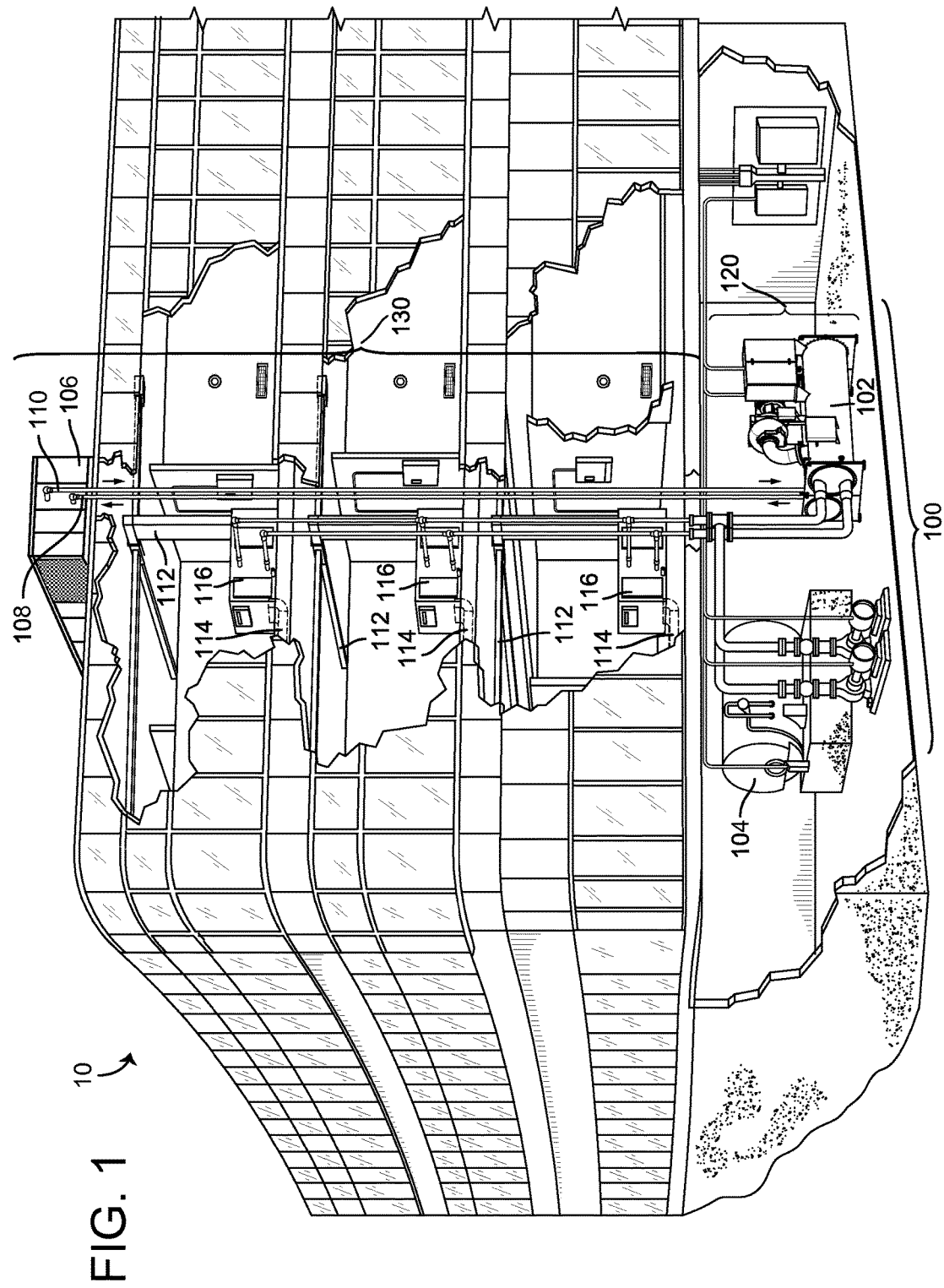
FIG. 1 is a drawing of a building equipped with a HVAC system, according to an exemplary embodiment.

Referring generally to the FIGURES, a targeted alert system with location-based and role-based alert distribution components thereof are shown, according to various exemplary embodiments. The targeted alert system can receive alerts from various systems and devices such as a fire detection and alarm system, an access control system, a building automation system, client devices, and mobile devices. Alerts received by the targeted alert system can include, for example, fire alarms, security alarms, intruder alerts, dangerous weather alerts, building equipment faults, event notifications, meeting notifications, evacuation alerts, or other types of alarms or notifications. The alerts can be received in a variety of formats such as text messages, email messages, mobile application notifications, etc. Alerts can be automatically generated by various systems or devices, manually provided by users, or otherwise submitted to the targeted alert system.

The targeted alert system can access a locations database to identify user and equipment locations. The locations database can be populated with location information that specifies the location of each user and device in the building. In some embodiments, the targeted alert system automatically identifies user and equipment locations using information received from the access control system (e.g., badge scans, camera images/video, etc.), mobile devices (e.g., nearby Wi-Fi access points), building equipment, or other devices capable of measuring and/or reporting location information.

The targeted alert system can access a roles database to identify user and equipment roles. The roles database can be populated with role information that specifies the responsibilities, permissions, functions, or other attributes of various users and equipment in the system. For example, the roles database can identify a user's job description (e.g., security guard, maintenance worker, technical support, etc.), group membership (e.g., member of research team, member of security personnel, etc.), special skills (e.g., trained in first aid or CPR, fluent in Russian, etc.), or other attributes that describe the function or capabilities of the user. The roles database can also identify the functions or capabilities of building equipment. For example, the roles database can indicate that a particular air handling unit is capable of providing airflow to a room or zone of the building.

The targeted alert system processes the alerts and distributes the alerts to specific users and systems based on their locations and roles. For example, if a security alert is received from the access control system (e.g., an unauthorized entry at a particular location), the targeted alert system can send a customized notification security personnel (e.g., users identified as having the "security personnel" role) with specific instructions for handling the security alert. The notification provided to each user can be based on the locations of the users relative to the location at which the unauthorized entry occurred. For example, security personnel located close to the unauthorized entry location can receive a first set of instructions, whereas security personnel located further from the unauthorized entry location can receive a second set of instructions.

Additionally, the instructions provided to security personnel can be different than the instructions provided to other building occupants. For example, security personnel can be provided with instructions to search the building and find the intruder, whereas non-security personnel can be provided with instructions to lock their doors and remain in their current locations. The targeted alert system can provide alerts in a variety of formats such as text messages, email messages, push notifications to an application running on a mobile device, and/or formats specific to a system or device receiving the alert.

The targeted alert system can also process and distribute other type of alerts. For example, the targeted alert system can receive an alert from a user that a team meeting is starting soon. The targeted alert system can identify all of the members of the team using information from the roles database and automatically send alerts to the team members informing them of the upcoming meeting. In some embodiments, the targeted alert system identifies the current locations of the team members before sending the alerts. For example, if a user is not located in the building (e.g., the user is on vacation or traveling), the targeted alert system can omit the user from the list of persons to whom the alert is distributed. This prevents users from receiving alerts that are not relevant to them based on their current location and/or role. Additional features and advantages of the targeted alert system are described in greater detail below.

Building Management System and HVAC System

Referring now to FIGS. 1-4, an exemplary building management system (BMS) and HVAC system in which the systems and methods of the present invention can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Figure 2:
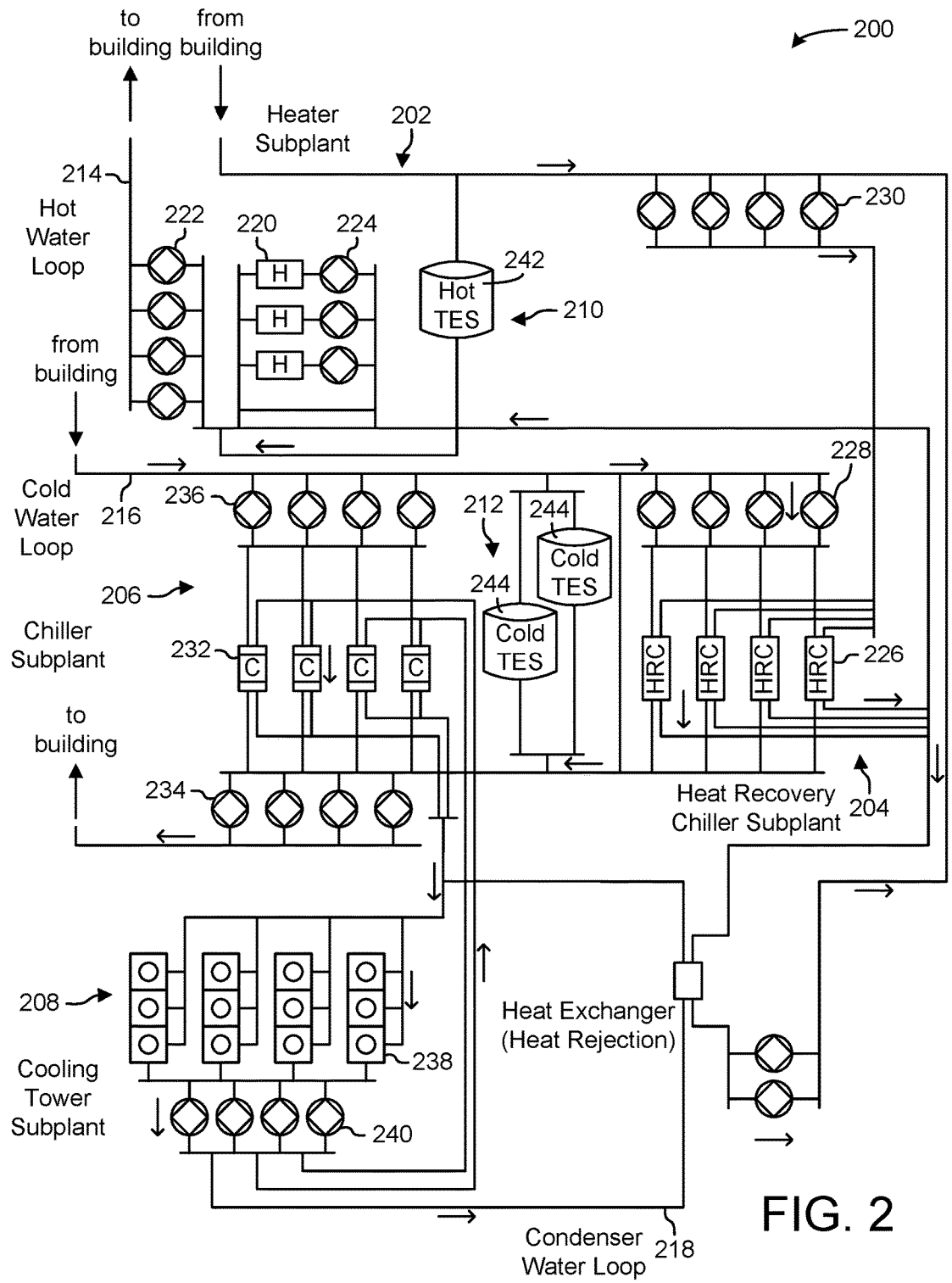
FIG. 2 is a block diagram of a waterside system that may be used in conjunction with the building of FIG. 1, according to an exemplary embodiment.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Figure 3:
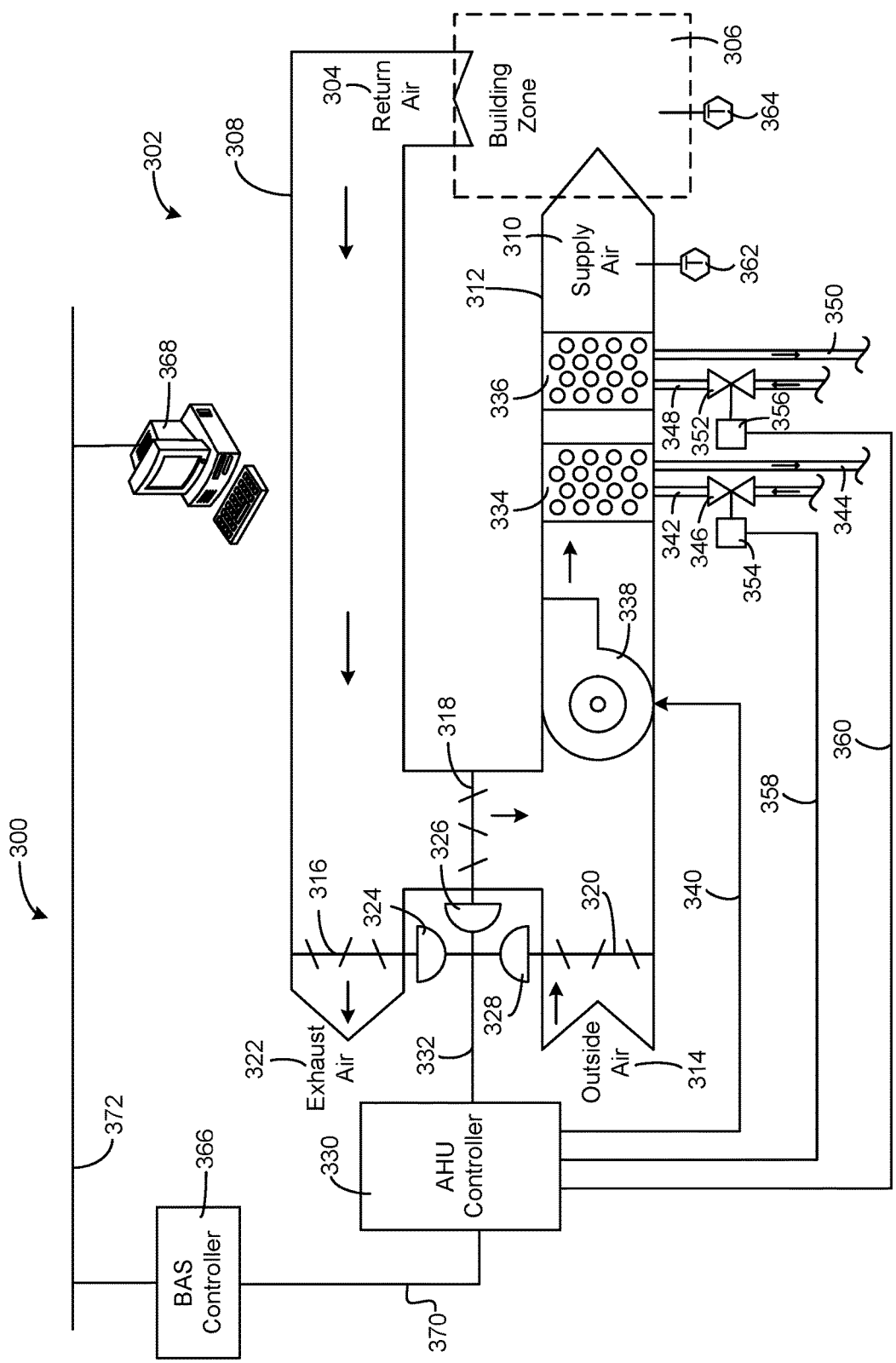
FIG. 3 is a block diagram of an airside system that may be used in conjunction with the building of FIG. 1, according to an exemplary embodiment.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Figure 4:
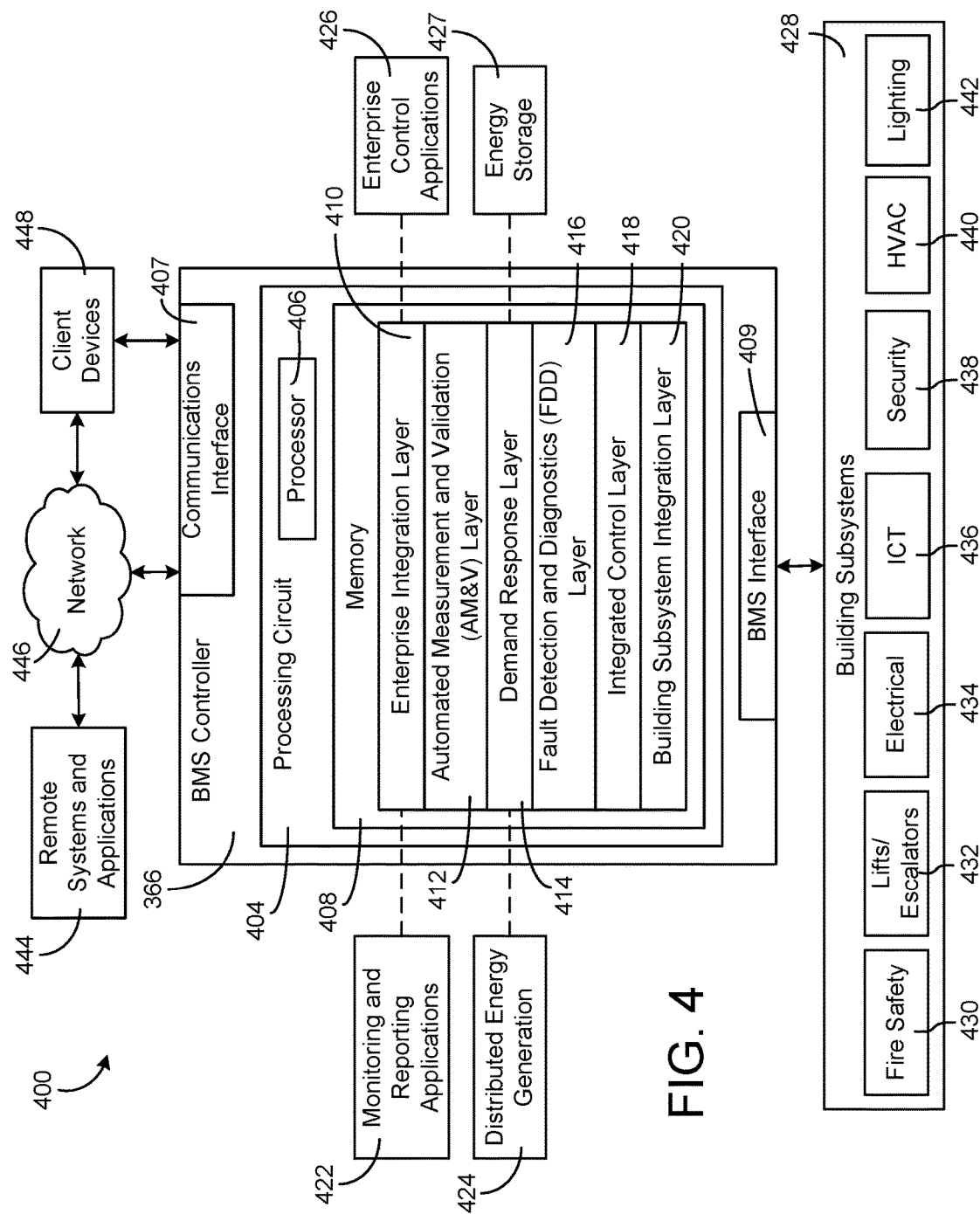
FIG. 4 is a block diagram of a building automation system (BAS) that may be used to monitor and/or control the building of FIG. 1, according to an exemplary embodiment.

Referring now to FIG. 4, a block diagram of a building management system (BMS) 400 is shown, according to an exemplary embodiment. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration can reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Location-Based and Role-Based Alert Distribution

Figure 5:
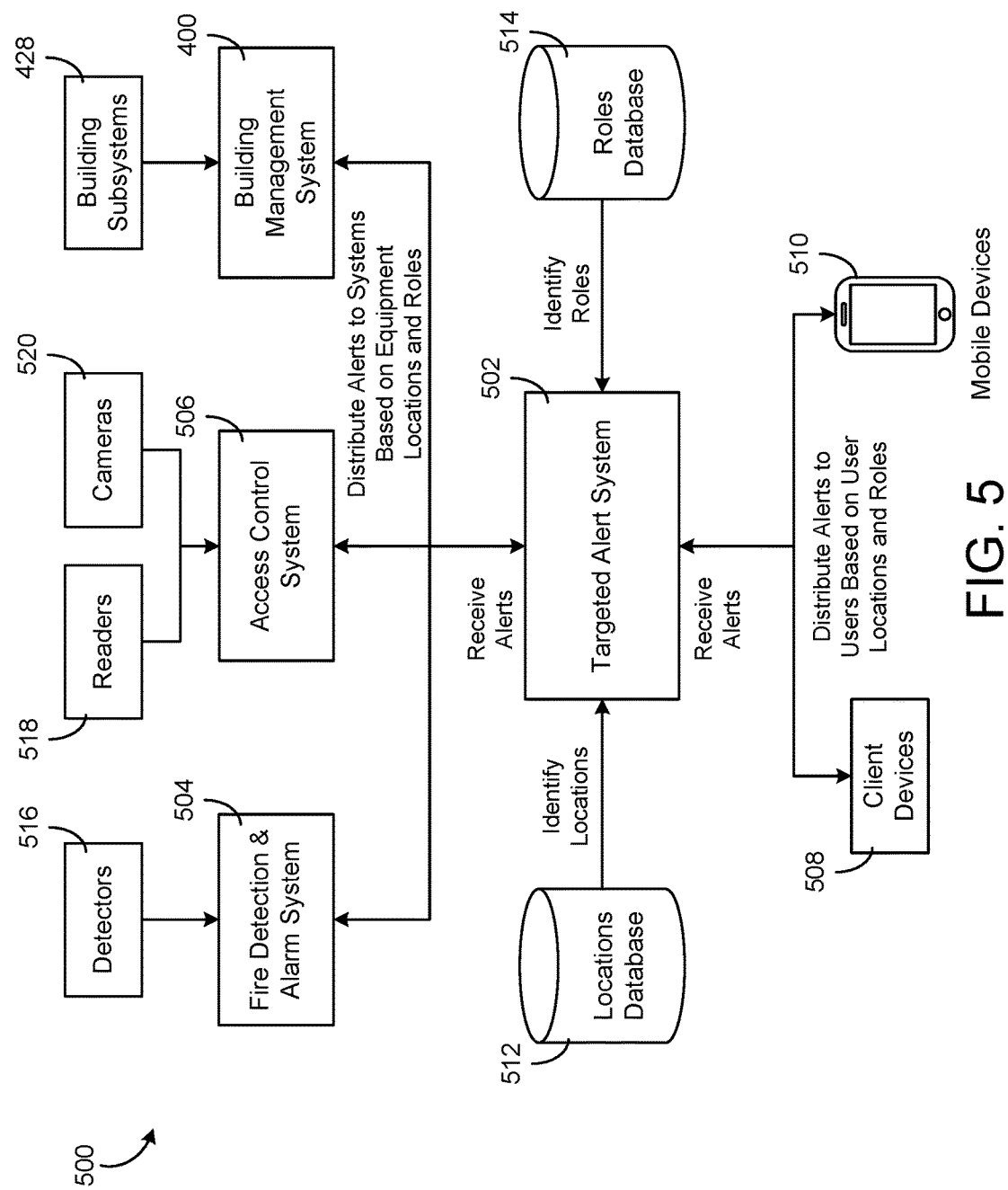
FIG. 5 is a block diagram of a building system with location-based and role-based alert distribution, according to an exemplary embodiment.

Referring now to FIG. 5, a block diagram of a building system 500 with location-based and role-based alert distribution is shown, according to an exemplary embodiment. System 500 is shown to include a targeted alert system 502. Targeted alert system 502 can receive alerts from various systems and devices. For example, targeted alert system 502 is shown receiving alerts from a fire detection and alarm system 504, an access control system 506, BMS 400, client devices 508, and mobile devices 510. Alerts received by targeted alert system 502 can include, for example, fire alarms, security alarms, intruder alerts, dangerous weather alerts, building equipment faults, event notifications, meeting notifications, evacuation alerts, or other types of alarms or notifications.

The alerts can be received in a variety of formats such as text messages, email messages, mobile application notifications, etc. In some embodiments, the alerts are received in a format specific to the system or device providing the alert. For example, alerts from fire detection and alarm system 504 can be received in a format specific to fire detection and alarm system 504 (e.g., fire alarms from detectors 516). Similarly, alerts from access control system 506 and BMS 400 can be received in formats specific to access control system 506 (e.g., alerts from readers 518 and cameras 520) and BMS 400 (e.g., alerts from building subsystems 428). Alerts can be automatically generated by various systems or devices, manually provided by users, or otherwise submitted to targeted alert system 502.

Targeted alert system 502 can access a locations database 512 to identify user and equipment locations. Locations database 512 can be populated with location information that specifies the location of each user and device in the building. In some embodiments, targeted alert system 502 automatically identifies user and equipment locations using information received from access control system 506 (e.g., badge scans, camera images/video, etc.), mobile devices (e.g., nearby Wi-Fi access points), building equipment, or other devices capable of measuring and/or reporting location information. Various techniques for automatically determining user locations and equipment locations are described in detail with reference to FIGS. 6-13.

Targeted alert system 502 can access a roles database 514 to identify user and equipment roles. Roles database 514 can be populated with role information that specifies the responsibilities, permissions, functions, or other attributes of various users and equipment in system 500. For example, roles database 514 can identify a user's job description (e.g., security guard, maintenance worker, technical support, etc.), group membership (e.g., member of research team, member of security personnel, etc.), special skills (e.g., trained in first aid or CPR, fluent in Russian, etc.), or other attributes that describe the function or capabilities of the user. Roles database 514 can also identify the functions or capabilities of building equipment. For example, the roles database can indicate that a particular air handling unit is capable of providing airflow to a room or zone of the building.

Targeted alert system 502 can be configured to process the alerts and distribute the alerts to specific users and systems based on their locations and roles. For example, if a security alert is received from access control system 506 (e.g., an unauthorized entry at a particular location), targeted alert system 502 can send a customized notification security personnel (e.g., users identified as having the "security personnel" role) with specific instructions for handling the security alert. The notification provided to each user can be based on the locations of the users relative to the location at which the unauthorized entry occurred. For example, security personnel located close to the unauthorized entry location can receive a first set of instructions, whereas security personnel located further from the unauthorized entry location can receive a second set of instructions.

Additionally, the instructions provided to security personnel can be different than the instructions provided to other building occupants. For example, security personnel can be provided with instructions to search the building and find the intruder, whereas non-security personnel can be provided with instructions to lock their doors and remain in their current locations. Targeted alert system 502 can provide alerts in a variety of formats such as text messages, email messages, push notifications to an application running on a mobile device, and/or formats specific to a system or device receiving the alert.

Targeted alert system 502 can also process and distribute other type of alerts. For example, targeted alert system 502 can receive an alert from a user that a team meeting is starting soon. Targeted alert system 502 can identify all of the members of the team using information from roles database 514 and automatically send alerts to the team members informing them of the upcoming meeting. In some embodiments, targeted alert system 502 identifies the current locations of the team members before sending the alerts. For example, if a user is not located in the building (e.g., the user is on vacation or traveling), targeted alert system 502 can omit the user from the list of persons to whom the alert is distributed. This prevents users from receiving alerts that are not relevant to them based on their current location and/or role. Additional features and advantages of targeted alert system 502 are described in greater detail below.

Determining User and Equipment Locations

Referring now to FIGS. 6-13, several systems and methods 600-1300 which can be used by targeted alert system 502 to automatically determine user and equipment locations are shown, according to an exemplary embodiment. Systems and methods 600-1300 can be used to automatically populate locations database 512 with the locations of various users and/or building equipment.

Figure 6:
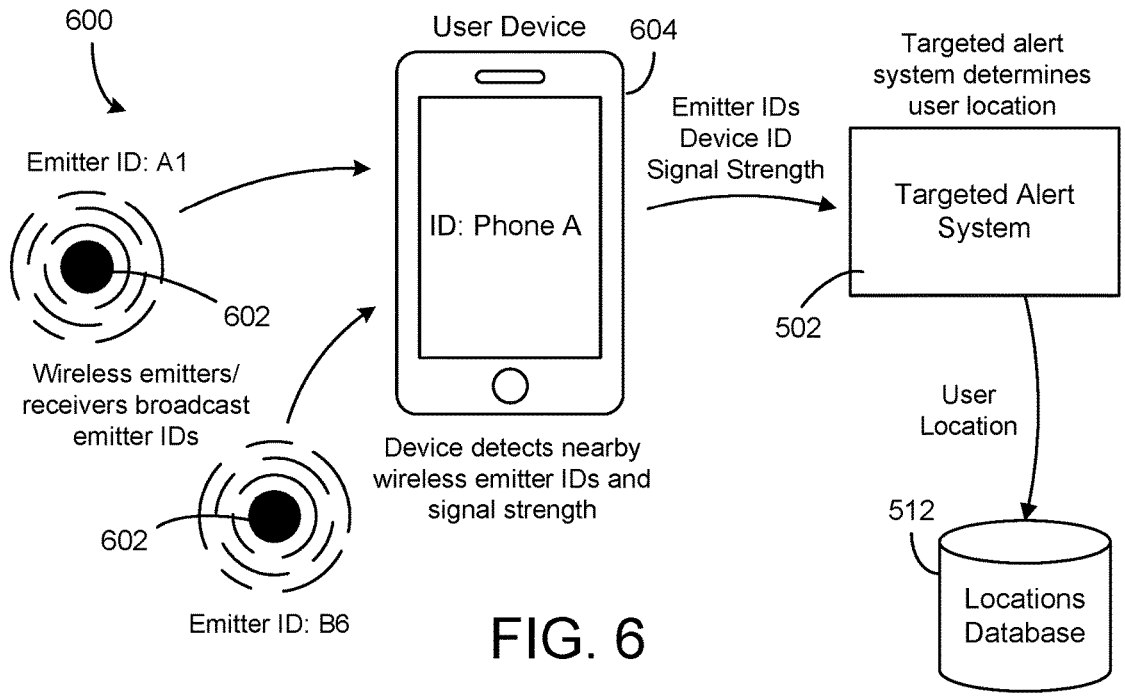
FIG. 6 is block diagram of a system for automatically determining the location of a user device based on signals from wireless emitters detected by the user device, according to an exemplary embodiment.

Referring particularly to FIG. 6, system 600 is shown to include a plurality of wireless emitters/receivers 602. Each of wireless emitters/receivers 602 can be located at a different position in the building (e.g., inside rooms or zones, at entrance/exit points, in hallways, etc.) and can be associated with a different emitter identifier. The locations of wireless emitters/receivers 602 can be known to targeted alert system 502.

Wireless emitters/receivers 602 can be configured to emit, receive, sense, relay, or otherwise engage in unidirectional or bidirectional wireless communications. Wireless emitters/receivers 602 can use any type wireless technology or communications protocol. For example, in various embodiments, wireless emitters/receivers 602 can be Bluetooth low energy (BLE) emitters, near field communications (NFC) devices, WiFi transceivers, RFID devices, ultrawide band (UWB) devices, infrared emitters/sensors, visible light communications (VLC) devices, ultrasound devices, cellular transceivers, iBeacons, or any other type of hardware configured to facilitate wireless data communications. In some embodiments, wireless emitters/receivers 602 are integrated with various devices within the building (e.g., thermostats, lighting sensors, zone controllers).

As shown in FIG. 6, each of wireless emitters/receivers 602 can broadcast a wireless signal. The wireless signal broadcast by a particular wireless emitter/receiver 602 can include an indication of the emitter identifier associated with the wireless emitter/receiver 602. In some embodiments, the wireless signal broadcast by each wireless emitter/receiver 602 includes multiple emitter identifiers (e.g., a UUID value, a major value, a minor value, etc.). A user device 604 can detect the wireless signals emitted by wireless emitter/receivers 602. User device 604 can be configured to identify the emitter identifier associated with the wireless signal. In some embodiments, user device 604 detects the signal strength of the wireless signals.

User device 604 is associated with a device identifier (e.g., "Phone A") that can be used to distinguish user device 604 from other user devices. In some embodiments, user device 604 reports the emitter identifiers, the device identifier, and/or the signal strengths associated with the detected wireless signals to targeted alert system 502. Targeted alert system 502 can use the emitter identifiers to determine a three-dimensional location of user device 604 (e.g., in a particular room or building zone, nearby a particular wireless emitter/receiver 602, etc.). For example, targeted alert system 502 can use the known locations of wireless emitters/receivers 602 to determine a location that is likely to be within range of all wireless emitters/receivers 602 detected by user device 604. In other embodiments, user device 604 determines its own three-dimensional location based on the detected emitter identifier(s) and reports the three-dimensional location to targeted alert system 502. Targeted alert system 502 can be configured to associate the three-dimensional location with the device identifier and to store the association in locations database 512.

Figure 7:
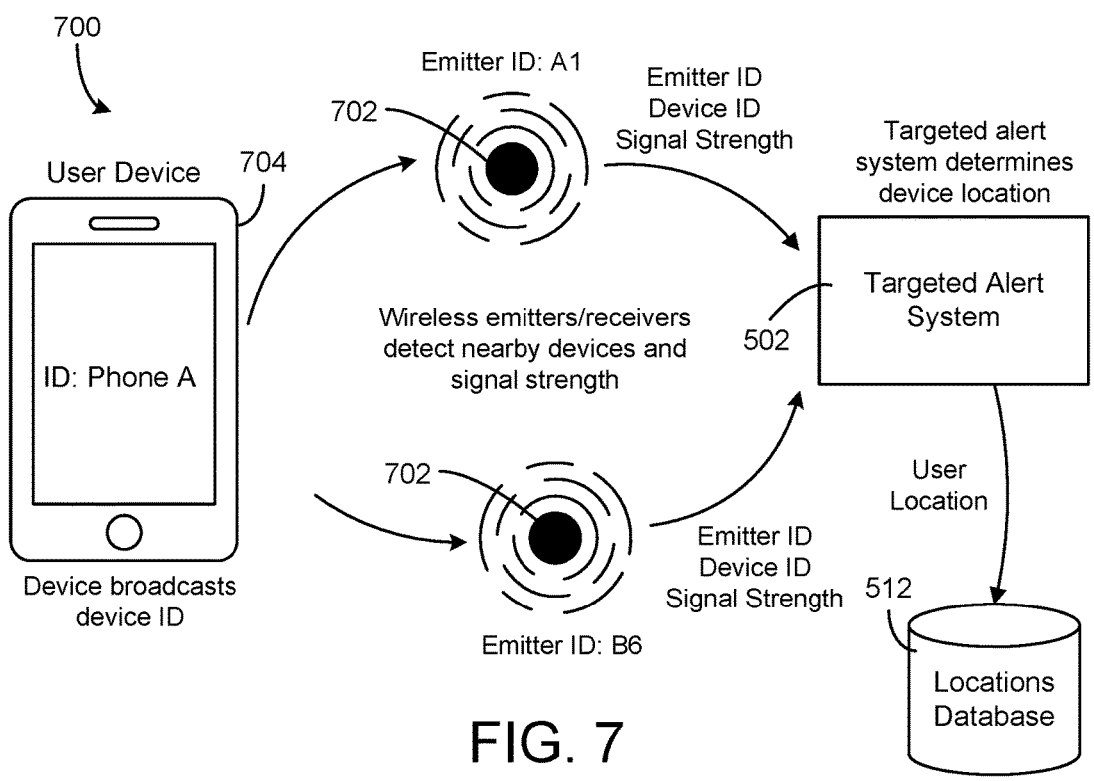
FIG. 7 is block diagram of another system for automatically determining the location of a user device based on signals from the mobile device detected by wireless receivers, according to an exemplary embodiment.

Referring now to FIG. 7, another system 700 for determining user device locations is shown, according to an exemplary embodiment. In system 700, a user device 704 broadcasts its device ID (e.g., using integrated wireless transmitters). Wireless emitters/receivers 702 can detect the broadcasted device ID and/or the signal strength associated therewith. Wireless emitters/receivers 702 can report their own emitter IDs, the detected user device IDs, and/or the signal strengths to targeted alert system 502. Targeted alert system 502 uses this information to determine a three-dimensional location of user device 704. For example, targeted alert system 502 can use the known locations of wireless emitters/receivers 702 to determine a location that is likely to be within range of all wireless emitters/receivers 702 that detect the same user device 704. Targeted alert system 502 can be configured to associate the three-dimensional location with the device identifier and to store the association in locations database 512.

Figure 8:
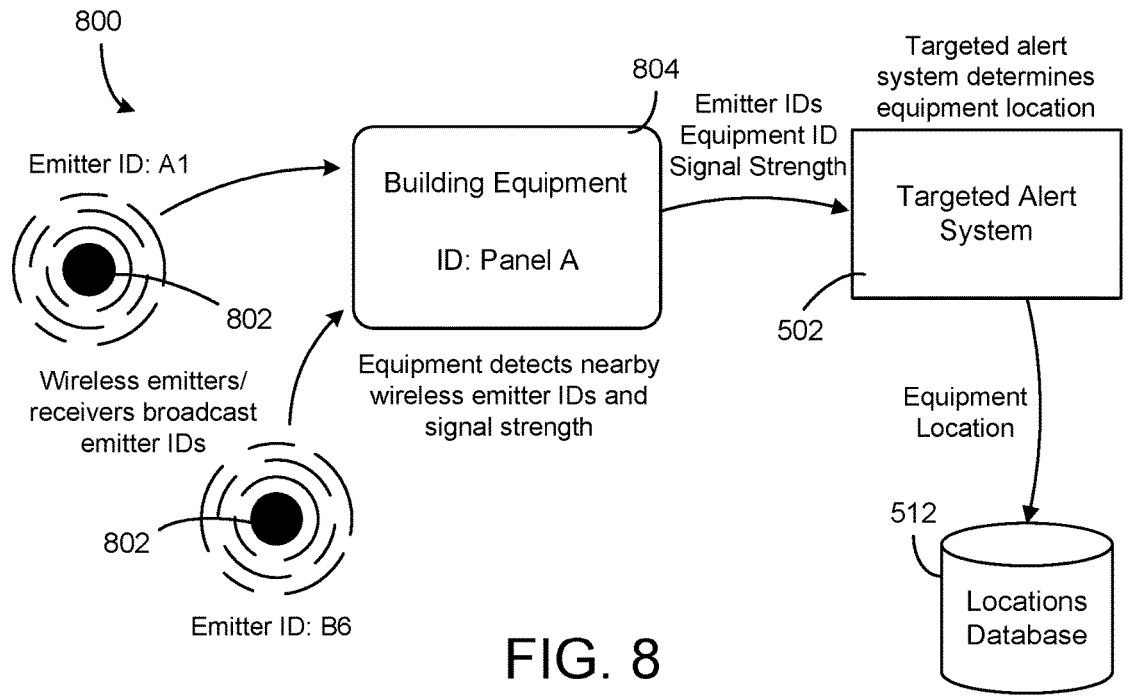
FIG. 8 is block diagram of a system for automatically determining the location of building equipment based on signals from wireless emitters detected by the building equipment, according to an exemplary embodiment.

Referring now to FIG. 8, a system 800 for determining the locations of building equipment is shown, according to an exemplary embodiment. In system 800 each of wireless emitters/receivers 802 broadcasts a wireless signal. Building equipment 804 can detect the wireless signals emitted by wireless emitter/receivers 802. Building equipment 804 can be configured to identify the emitter identifier associated with the wireless signal. In some embodiments, building equipment 804 detects the signal strength of the wireless signals.

Building equipment 804 can be associated with an equipment identifier (e.g., "Panel A") that can be used to distinguish building equipment 804 from other equipment in system 800. In some embodiments, building equipment 804 reports the emitter identifiers, the equipment identifier, and/or the signal strengths associated with the detected wireless signals to targeted alert system 502. Targeted alert system 502 can use the emitter identifiers to determine a three-dimensional location of building equipment 804 (e.g., in a particular room or building zone, nearby a particular wireless emitter receiver, etc.). For example, targeted alert system 502 can use the known locations of wireless emitters/receivers 802 to determine a location that is likely to be within range of all wireless emitters/receivers 802 detected by building equipment 804. In other embodiments, building equipment 804 determines its own three-dimensional location based on the detected emitter identifier(s) and reports the three-dimensional location to targeted alert system 502. Targeted alert system 502 can be configured to associate the three-dimensional location with the equipment identifier and to store the association in locations database 512.

Figure 9:
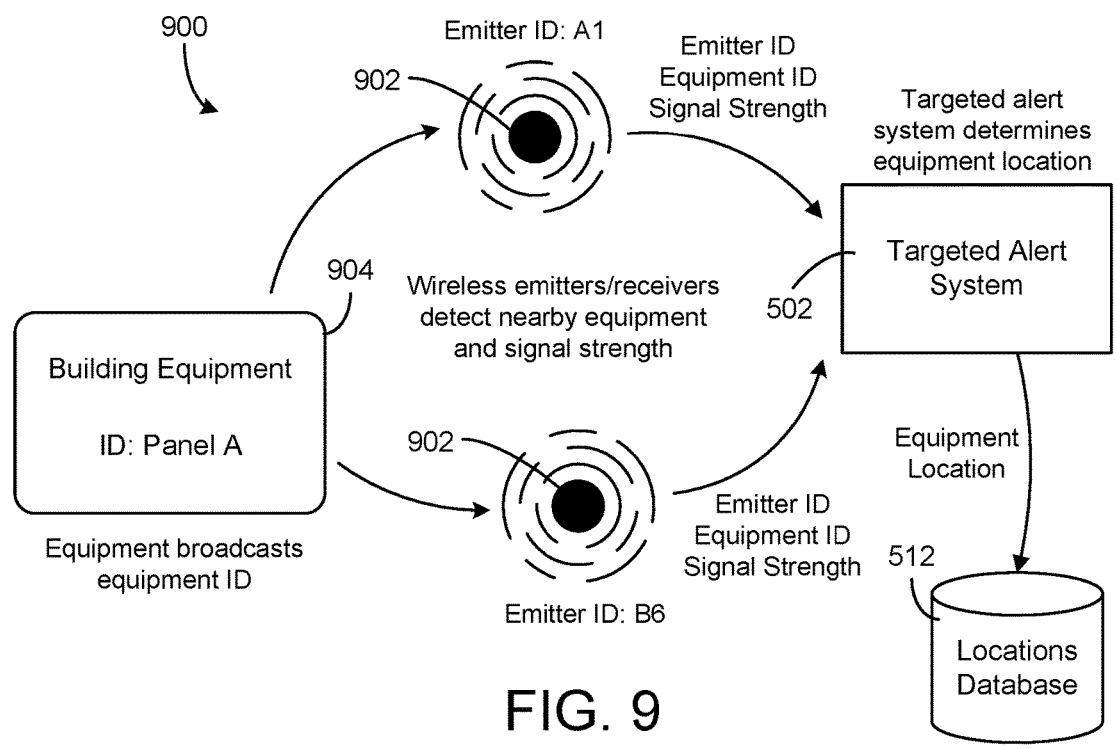
FIG. 9 is block diagram of another system for automatically determining the location of building equipment based on signals from the building equipment detected by wireless receivers, according to an exemplary embodiment.

Referring now to FIG. 9, another system 900 for determining equipment locations is shown, according to an exemplary embodiment. In system 900, building equipment 904 broadcasts its device ID (e.g., using integrated wireless transmitters). Wireless emitters/receivers 902 can detect the broadcasted device ID and/or the signal strength associated therewith. Wireless emitters/receivers 802 can report their own emitter IDs, the detected equipment IDs, and/or the signal strengths to targeted alert system 502. Targeted alert system 502 uses this information to determine a three-dimensional location of building equipment 904. For example, targeted alert system 502 can use the known locations of wireless emitters/receivers 902 to determine a location that is likely to be within range of all wireless emitters/receivers 902 that detect the same building equipment 904. Targeted alert system 502 can be configured to associate the three-dimensional location with the equipment identifier and to store the association in locations database 512.

Figure 10:
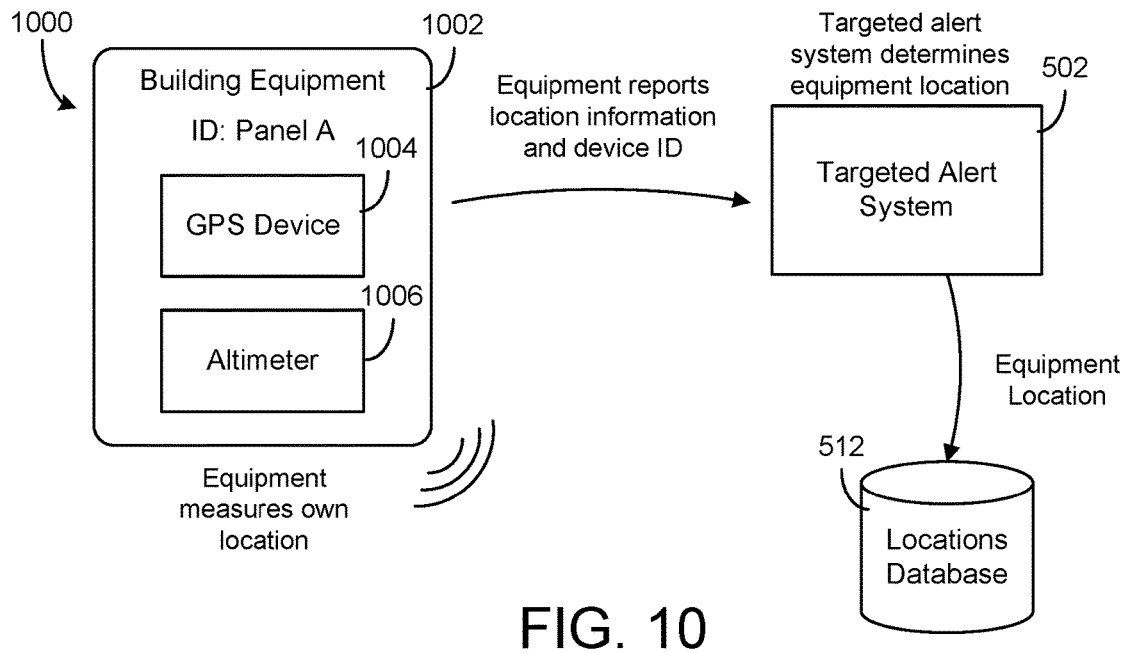
FIG. 10 is a block diagram of another system for automatically determining the location of building equipment based on location measurements from the building equipment, according to an exemplary embodiment.

Referring now to FIG. 10, another system 1000 for determining equipment locations is shown, according to an exemplary embodiment. In system 1000, building equipment 1002 includes integrated location-sensing electronics (e.g., a GPS device 1004, an altimeter 1006, etc.). Building equipment 1002 can measure its own location using location-sensing electronics 1004-1006 and report the location to targeted alert system 502. Building equipment 1002 can also report its device identifier. In some embodiments, building equipment 1002 reports the location information (e.g., GPS data and altitude data) and the device identifier to targeted alert system 502. Targeted alert system 502 can use the location information and the device identifier to determine a three-dimensional location of building equipment 1002. In other embodiments, building equipment 1002 determines its own three-dimensional (i.e., global) position based on the GPS data and altitude data and reports the three-dimensional location to targeted alert system 502. Targeted alert system 502 can be configured to associate the location with the device identifier and to store the association in locations database 512.

Figure 11:
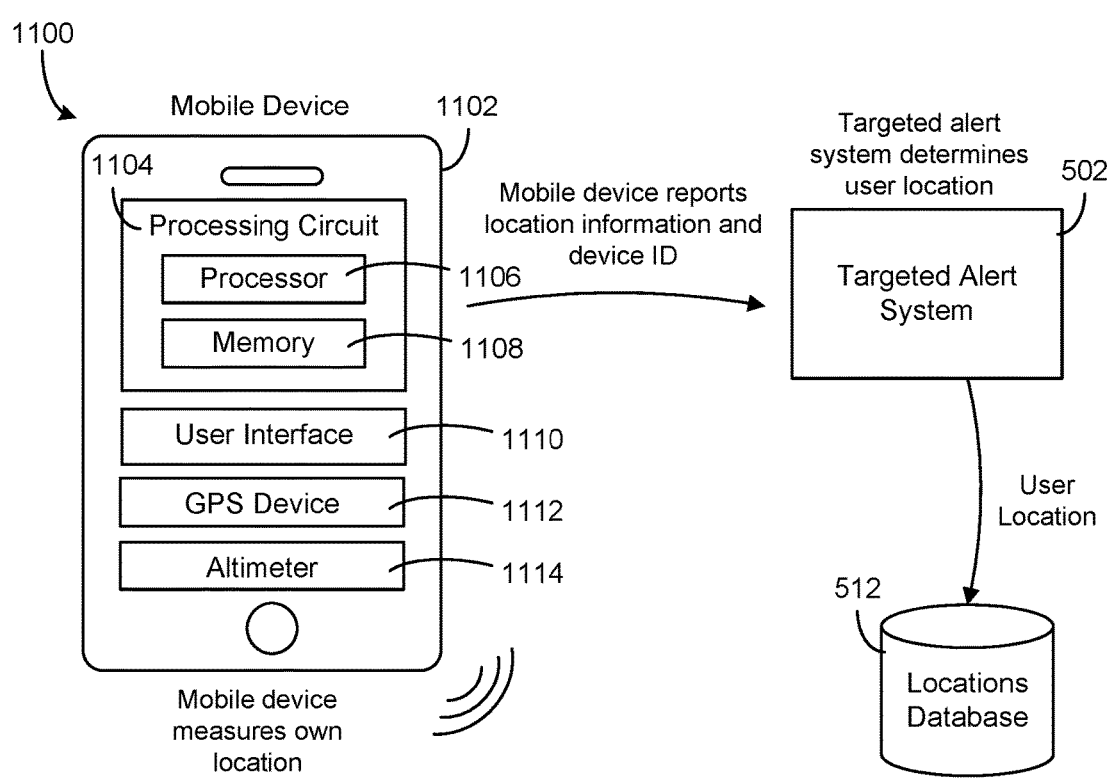
FIG. 11 is a block diagram of another system for automatically determining the location of a mobile device based on location measurements from the mobile device, according to an exemplary embodiment.

Referring now to FIG. 11, another system 1100 for determining user locations is shown, according to an exemplary embodiment. In system 1100, a mobile device 1102 includes location-sensing electronics (e.g., a GPS device 1112, an altimeter 1114, etc.). Mobile device 1102 can measure its own location using location-sensing electronics 1112-1114 and can report such measurements to targeted alert system 502. Targeted alert system 502 can use the measured location of mobile device 1102 to determine the location of a user associated with mobile device 1102. For example, targeted alert system 502 can access a database to identify a particular user associated with mobile device 1102. Targeted alert system 502 can associate the location received from mobile device 1102 with the identified user and store the location in locations database 512.

In some embodiments, mobile device 1102 includes a processing circuit 1104 and a user interface 1110. Processing circuit 1104 is shown to include a processor 1106 and memory 1108. Processor 1106 can be a general purpose or specific purpose processor, an application specific integrated circuit (ASIC), one or more field programmable gate arrays (FPGAs), a group of processing components, or other suitable processing components. Processor 1106 is configured to execute computer code or instructions stored in memory 1108 or received from other computer readable media (e.g., CDROM, network storage, a remote server, etc.).

Memory 1108 can include one or more devices (e.g., memory units, memory devices, storage devices, etc.) for storing data and/or computer code for completing and/or facilitating the various processes described in the present disclosure. Memory 1108 can include random access memory (RAM), read-only memory (ROM), hard drive storage, temporary storage, non-volatile memory, flash memory, optical memory, or any other suitable memory for storing software objects and/or computer instructions. Memory 1108 can include database components, object code components, script components, or any other type of information structure for supporting the various activities and information structures described in the present disclosure. Memory 1108 can be communicably connected to processor 1106 via processing circuit 1104 and can include computer code for executing (e.g., by processor 1106) one or more processes described herein. When processor 1106 executes instructions stored in memory 1108, processor 1106 generally configures mobile device 1102 (and more particularly processing circuit 1104) to complete such activities.

User interface 1110 can include various devices configured to receive input from a user. For example, user interface 1110 can include a touch-sensitive panel, capacitive or resistive touch buttons, physical buttons, switches, dials, etc. In some embodiments, the sensors also function as user input devices. For example, user input can be received via the microphone, camera, IMU, or other sensor devices of mobile device 1102.

In some embodiments, mobile device 1102 is configured to record a GPS location at an entrance of the building. Mobile device 1102 can include an accelerometer configured to collect data from which a change in position can be determined. Mobile device 1102 or targeted alert system 502 can combine the GPS location of the building entrance with the change in position of mobile device 1102 from the building entrance to its current location to determine the three-dimensional location of mobile device 1102 within the building.

In some embodiments, mobile device 1102 reports the location information (e.g., GPS data and altitude data) and the device identifier to targeted alert system 502. Targeted alert system 502 may use the location information and the device identifier to determine a three-dimensional location of mobile device 1102. In other embodiments, mobile device 1102 determines its own three-dimensional (i.e., global) position based on the GPS data and altitude data and reports the three-dimensional location to targeted alert system 502. Targeted alert system 502 can associate the location with mobile device 1102 and/or a particular user and can store the association in locations database 512.

Figure 12:
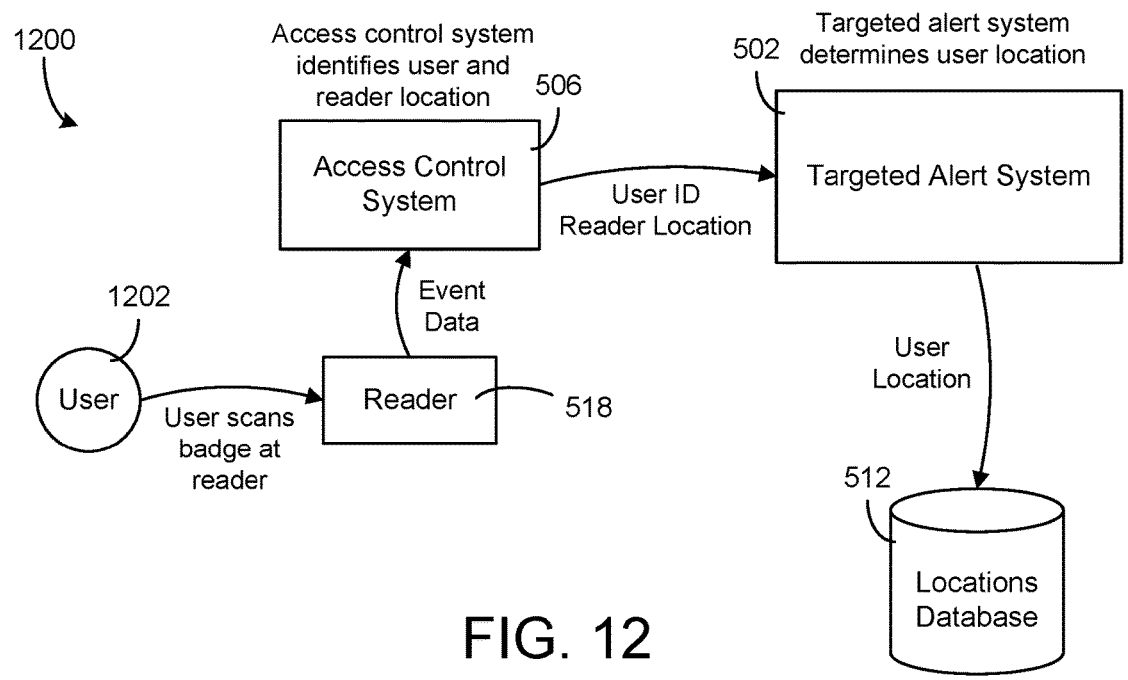
FIG. 12 is a block diagram of a system for determining the location of a user based on event data from an access control system, according to an exemplary embodiment.

Referring now to FIG. 12, another system 1200 for determining user locations is shown, according to an exemplary embodiment. In system 1200, user locations are determined using event data from access control system 506. For example, a user's location can be identified when a user 1202 passes through a security checkpoint or scans a security badge at a reader 518 of access control system 506. Reader 518 provides event data to access control system 506 (e.g., badge ID, timestamp, reader ID, etc.). Access control system 506 can use the event data to identify user 1202 and determine the location of reader 518 at which the badge scan occurred. Access control system 506 can report the user ID and reader location to targeted alert system 502. Targeted alert system 502 can use the information from access control system 506 to determine the user's location and can store the user location in locations database 512.

Figure 13:
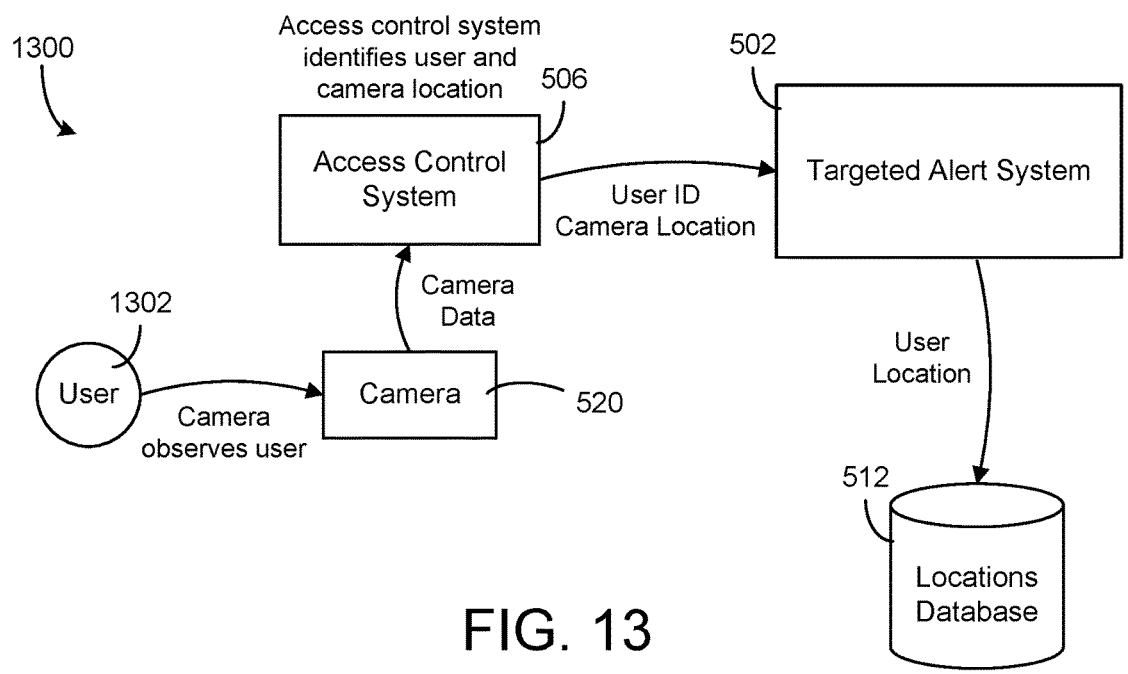
FIG. 13 is a block diagram of another system for determining the location of a user based on camera data from the access control system, according to an exemplary embodiment.

Referring now to FIG. 13, another system 1300 for determining user locations is shown, according to an exemplary embodiment. In system 1300, user locations are determined using camera data from access control system 506. For example, a user's location can be identified when a camera 520 of access control system 506 observes user 1302. Camera 520 provides camera data (e.g., photos, video, etc.) to access control system 506. Access control system 506 can use the camera data to identify user 1302 (e.g., using facial recognition techniques) and determine the location of camera 520 that observed user 1302. Access control system 506 can report the user ID and the camera location to targeted alert system 502. Targeted alert system 502 can use the information from access control system 506 to determine the user's location and can store the user location in locations database 512.

Targeted Alert Examples

Figure 14:
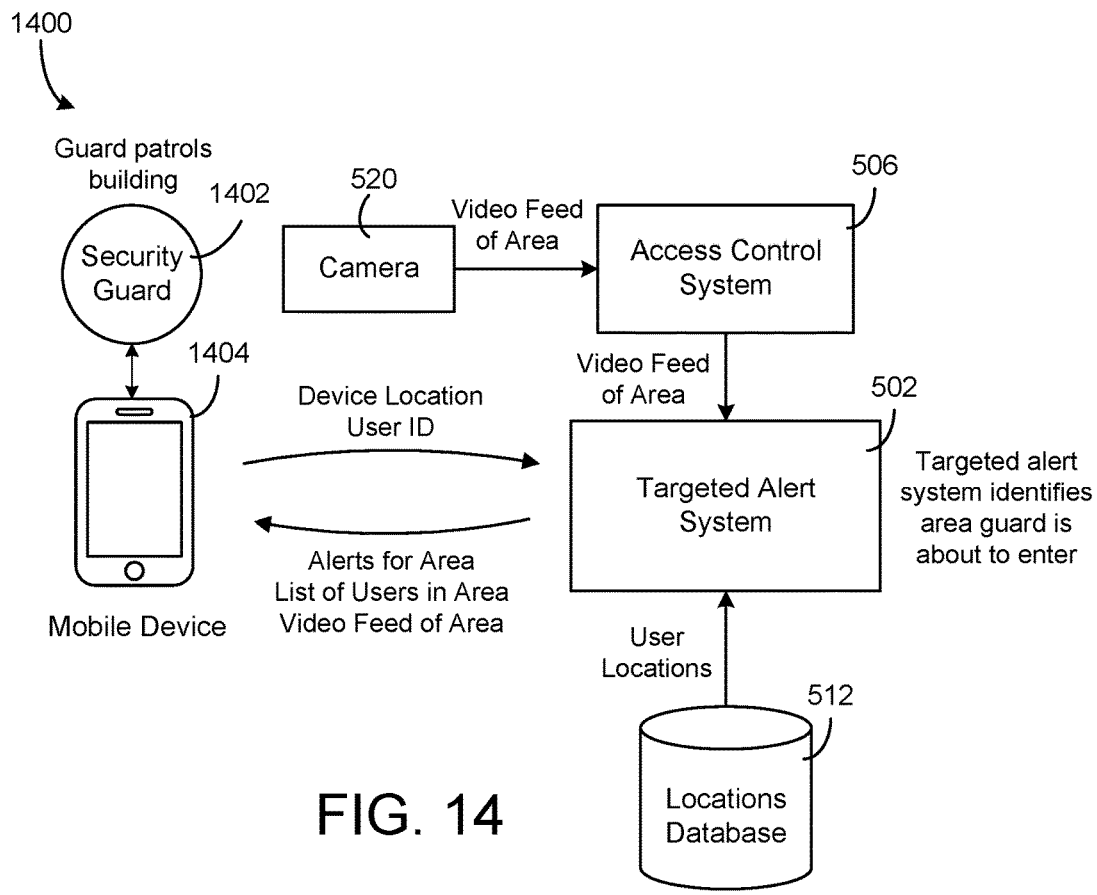
FIG. 14 is a block diagram illustrating a guard tour implementation of the targeted alert system, according to an exemplary embodiment.
Figure 15:
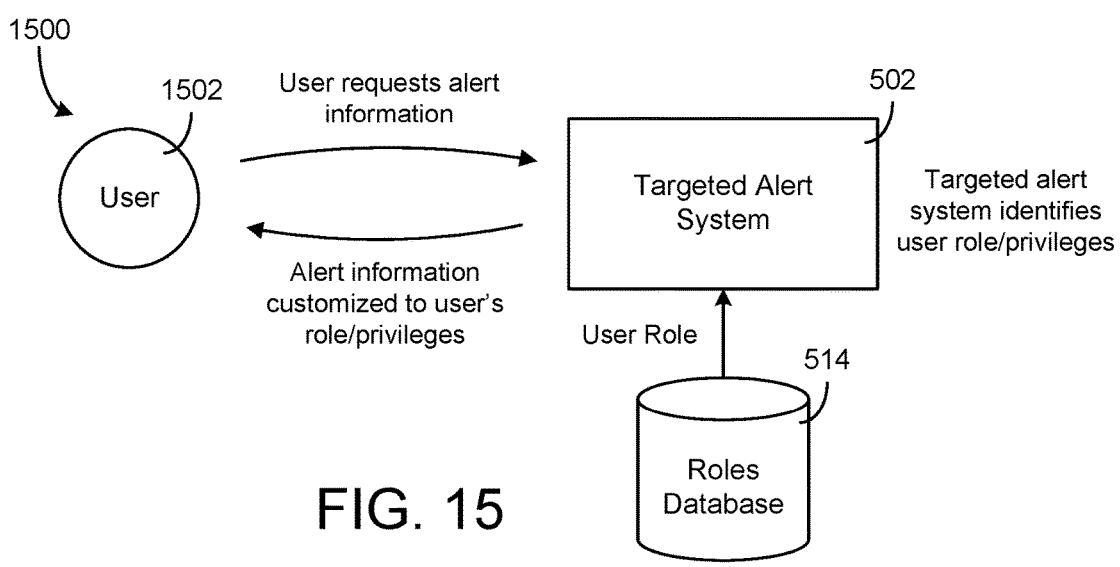
FIG. 15 is a block diagram illustrating how the targeted alert system responds to requests for alert information, according to an exemplary embodiment.

Referring now to FIGS. 14-15, example implementations of targeted alert system 502 are shown. Referring particularly to FIG. 14, a block diagram 1400 illustrating a guard tour implementation is shown, according to an exemplary embodiment. A security guard 1402 patrols the building while carrying a mobile device 1404. The location of mobile device 1404 (and thus the location of security guard 1402) can be determined using any of the systems previously described. Targeted alert system 502 can monitor the security guard's location and provide security guard 1402 with role-specific information that depends on the security guard's current location.

In some embodiments, targeted alert system 502 uses the location of mobile device 1404 over time (e.g., a location trajectory) to identify an area that security guard 1402 is about to enter. A history of past locations of mobile device 1404 can be retrieved from locations database 512 to determine the path that security guard 1402 has taken. Targeted alert system 502 can determine the area that security guard 1402 is about to enter using the history of past locations in combination with the current location of mobile device 1404. Such information can indicate a movement vector or path that leads toward the location security guard 1402 is about to enter. The area can be an area of a building (e.g., a specific room or zone) or an outdoor area.

Targeted alert system 502 can provide security guard 1402 with relevant information pertaining to the area that security guard 1402 is about to enter. For example, targeted alert system 502 can provide security guard 1402 with a list of alerts for the area, a list of users in the area along with their photos, a video feed from a camera 520 that monitors the area, or other status information for the area. This allows security guard 1402 to be prepared for area that security guard 1402 is about to enter. In some embodiments, targeted alert system 502 provides security guard 1402 with a map of the building (e.g., a floorplan view) with the current location of security guard 1402 marked on the map. As security guard 1402 moves through the building, the location can be dynamically updated with the new location of security guard 1402.

In some embodiments, targeted alert system 502 is configured to provide directions to specific areas based on the current location of mobile device 1404. The directions can include step-by-step instructions similar to the instructions provided by a vehicle navigation system. Advantageously, the ability to automatically identify the location of mobile device 1404 allows targeted alert system 502 to direct the user to a specific location in the building. This feature can also be used by other users who may not be familiar with the layout of the building (e.g., delivery personnel, visitors, contractors, etc.) to find specific rooms or locations.

Referring now to FIG. 15, a block diagram 1500 illustrating how targeted alert system 502 responds to requests for alert information is shown, according to an exemplary embodiment. Different users 1502 can have access to different assets, which can be defined by the user's role. When a user 1502 requests alert information from targeted alert system 502, targeted alert system 502 can access roles database 514 to identify the user's role and/or privileges. Targeted alert system 502 can then provide user 1502 with alert information customized to the user's role and/or privileges. For example, a maintenance worker entering an area can be provided with a list of alerts relating to equipment that require maintenance. In the event of a fire or other emergency, emergency personnel entering the area can be provided with a list of users still in the area along with their photos. The ability to provide users 1502 with customized alerts based on their role and current location allows for targeted distribution of information relevant to user 1502 at the time.

Targeted Alert System

Figure 16:
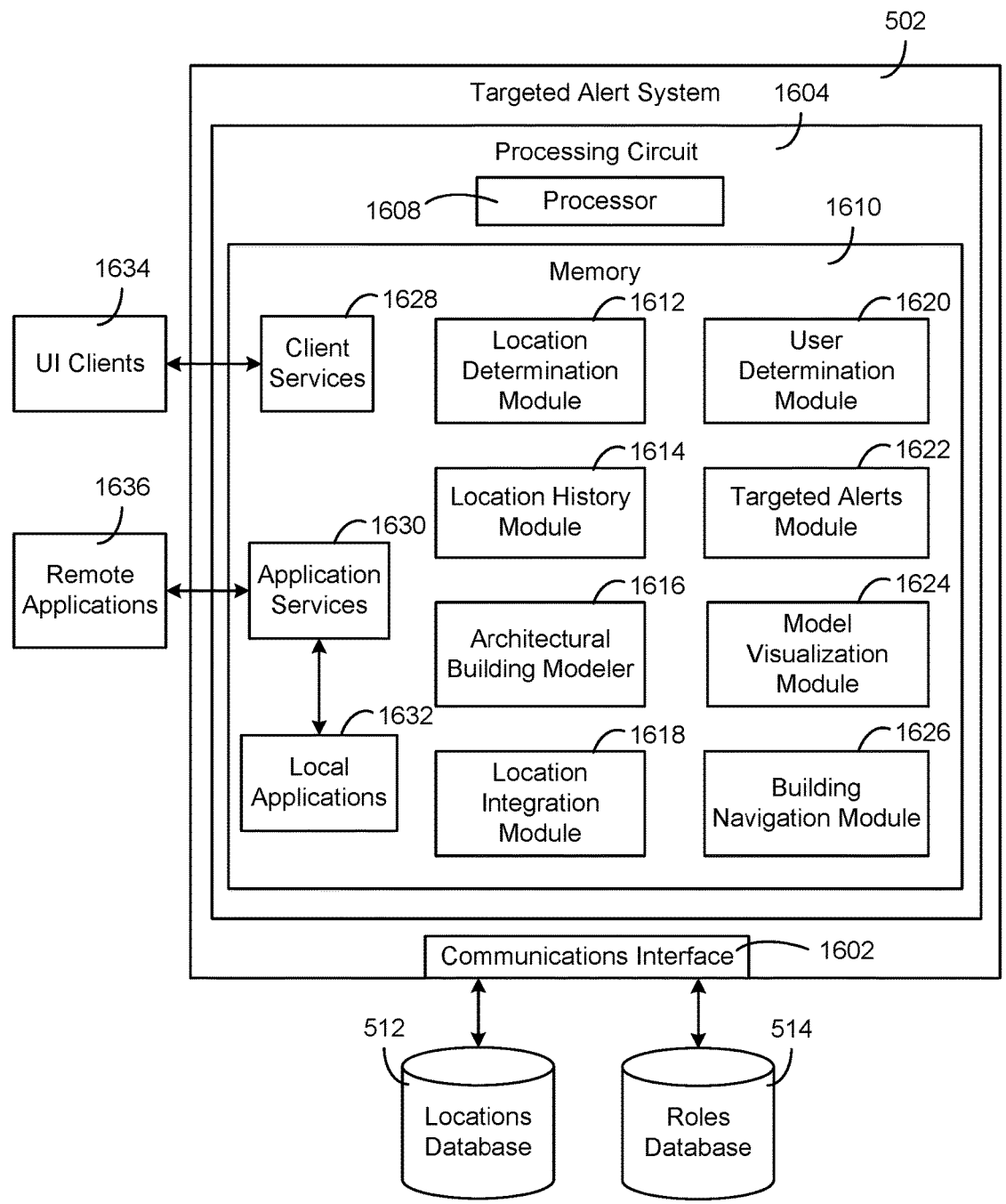
FIG. 16 is a block diagram illustrating the targeted alert system in greater detail, according to an exemplary embodiment.

Referring now to FIG. 16, a block diagram illustrating targeted alert system 502 in greater detail is shown, according to an exemplary embodiment. Targeted alert system 502 is shown to include a communications interface 1602 and a processing circuit 1604. Communications interface 1602 can include wired or wireless interfaces (e.g., jacks, antennas, transmitters, receivers, transceivers, wire terminals, etc.) for conducting data communications with various systems, devices, or networks. For example, communications interface 1602 can include an Ethernet card and port for sending and receiving data via an Ethernet-based communications network. As another example, communications interface 1602 can include a WiFi transceiver for communicating via a wireless communications network.

Communications interface 1602 can be configured to communicate via local area networks (e.g., a building LAN), wide area networks (e.g., the Internet, a cellular network, etc.), and/or conduct direct communications (e.g., NFC, Bluetooth, etc.). In various embodiments, communications interface 1602 can be configured to conduct wired and/or wireless communications. In some embodiments, communications interface 1602 includes an application gateway configured to receive input from applications running on client devices. For example, communications interface 1602 can include one or more wireless transceivers (e.g., a WiFi transceiver, a Bluetooth transceiver, a NFC transceiver, a cellular transceiver, etc.) for communicating with mobile devices.

Processing circuit 1604 is shown to include a processor 1608 and memory 1610. Processor 1608 can be a general purpose or specific purpose processor, an application specific integrated circuit (ASIC), one or more field programmable gate arrays (FPGAs), a group of processing components, or other suitable processing components. Processor 1608 is configured to execute computer code or instructions stored in memory 1610 or received from other computer readable media (e.g., CDROM, network storage, a remote server, etc.).

Memory 1610 can include one or more devices (e.g., memory units, memory devices, storage devices, etc.) for storing data and/or computer code for completing and/or facilitating the various processes described in the present disclosure. Memory 1610 can include random access memory (RAM), read-only memory (ROM), hard drive storage, temporary storage, non-volatile memory, flash memory, optical memory, or any other suitable memory for storing software objects and/or computer instructions. Memory 1610 can include database components, object code components, script components, or any other type of information structure for supporting the various activities and information structures described in the present disclosure. Memory 1610 can be communicably connected to processor 1608 via processing circuit 1604 and can include computer code for executing (e.g., by processor 1608) one or more processes described herein. When processor 1608 executes instructions stored in memory 1610, processor 1608 generally configures targeted alert system 502 (and more particularly processing circuit 1604) to complete such activities.

Still referring to FIG. 16, targeted alert system 502 is shown to include client services 1628 and application services 1630. Client services 1628 can be configured to facilitate interaction and/or communication between targeted alert system 502 and various internal or external clients or applications. For example, client services 1628 can include web services or application programming interfaces available for communication by UI clients 1634 and remote applications 1636 (e.g., applications running on a mobile device, energy monitoring applications, applications allowing a user to monitor the performance of targeted alert system 502, automated fault detection and diagnostics systems, etc.). Application services 1630 may facilitate direct or indirect communications between remote applications 1636, local applications 1632, and targeted alert system 502. For example, application services 1630 may allow targeted alert system 502 to communicate (e.g., over a communications network) with remote applications 1636 running on mobile devices and/or with a BAS controller.

In some embodiments, application services 1630 provide an applications gateway for conducting electronic data communications with UI clients 1634 and/or remote applications 1636. For example, application services 1630 can be configured to receive communications from mobile devices and/or building equipment. Communications can include detected emitter identifiers, GPS data, altimeter data, accelerometer data, and/or other data from mobile devices and/or building equipment. Client services 1628 can provide client devices with a graphical visualization (e.g., a three-dimensional model, an augmented reality overlay, a map, etc.) of the building with the locations of various users and devices (e.g., building equipment, mobile devices, user devices, etc.) represented in the graphical visualization (described in greater detail below).

Still referring to FIG. 16, targeted alert system 502 is shown to include a location determination module 1612. Location determination module 1612 can be configured to determine the location of users and building equipment in or around the building. In some embodiments, location determination module 1612 determines the location of users based on information received from mobile devices carried by the users. Similarly, location determination module 1612 can determine the locations of building equipment device based on information received from the building equipment. For example, location determination module 1612 can receive one or more emitter identifiers reported by the mobile devices and/or building equipment, as described with reference to FIGS. 6-9. For ease of explanation, both mobile devices and building equipment will be referred to as "tracked devices" for the remainder of this disclosure.

Location determination module 1612 can receive a single emitter identifier from the tracked devices or multiple emitter identifiers from the tracked devices. For example, a tracked device can report the emitter identifier associated with each wireless signal (e.g., from one of the wireless emitters/receivers) that is detected by the tracked device. If the tracked device is within range of multiple wireless emitters/receivers, the tracked device can report multiple emitter identifiers. For embodiments in which the tracked device reports multiple emitter identifiers, each emitter identifier can be reported in conjunction with a signal strength. The signal strength associated with an emitter identifier can indicate a relative proximity of the tracked device to the corresponding wireless emitter (e.g., high signal strengths indicating a closer proximity and low signal strengths indicating a more distant proximity).

Location determination module 1612 can determine the location of a tracked device based on the emitter identifier or emitter identifiers received from the tracked device. In some embodiments, location determination module 1612 uses the emitter identifier(s) received from a tracked device to determine which of the plurality of the wireless emitters/receivers is closest to the tracked device (e.g., based on signal strength, triangulation, etc.). For example, location determination module 1612 can use an emitter identifier received from a tracked device as an input to a relational database (e.g., a lookup table, a device mapping, etc.). Each emitter identifier can uniquely indicate a particular wireless emitter (e.g., by emitter device name, by serial number, etc.) and/or a particular location (e.g., a zone name, a zone identifier, etc.) in the relational database.

In some embodiments, location determination module 1612 receives GPS data and/or altimeter data from the tracked device. For example, various tracked devices can be equipped with GPS receivers and/or altimeters. The tracked devices can report location information (e.g., GPS data and altitude data) and a device identifier to location determination module 1612. Location determination module 1612 can use the location information and the device identifier to determine a three-dimensional location of the tracked device. Location determination module 1612 can be configured to associate the three-dimensional location with the device identifier and to store the association in locations database 512.

In some embodiments, location determination module 1612 receives GPS data and/or altimeter data from a tracked device. In some embodiments, the tracked device records a GPS location and/or altitude an entrance of the building (e.g., for embodiments in which the GPS signal is too weak to determine obtain a GPS measurement within the building). The tracked device can include an accelerometer configured to collect data from which a change in position can be determined. The tracked device can report the accelerometer data to location determination module 1612. Location determination module 1612 van combine the location information at the building entrance with the change in position between the building entrance and the location of the tracked device to determine the three-dimensional location of the tracked device within the building.

Still referring to FIG. 16, targeted alert system 502 is shown to include a location history module 1614. Location history module 1614 can be configured to create and/or manage a location history for tracked devices within building the (e.g., BMS devices, mobile devices, client devices, etc.). A location history for a tracked device can include a series of locations (e.g., determined by the location determination module) at which the device has been located in the past. Location history module 1614 can record the locations determined by the location determination module for each device in a database such that a location history for a particular device can be constructed.

The location history for a mobile device can facilitate automatically providing the mobile device with alerts a particular room or zone in a building, even if the mobile device is not currently in the room or zone. For example, the location history for a mobile device can be used to provide a user with a list of alerts for an area that the user device is about to enter, an area in which the mobile device was previously located, or an area in which the mobile device is currently located. This feature provides a user with alerts that may be relevant to the user in the near future (e.g., if the user is headed toward the area) prior to the user reaching the area.

In some embodiments, location history module 1614 stores each location in the location history with a corresponding time parameter. The time parameter can be combined with the three-dimensional location information for a tracked device to generate four-dimensional coordinates for a device (e.g., three location coordinates and a time coordinate; two location coordinates, a floor parameter, and a time parameter, etc.). In some embodiments, location history module 1614 stores each location determined by the location determination module as an event. Each event can include location information (e.g., two-dimensional or three-dimensional location coordinates, etc.), a time parameter (e.g., identifying a time at which the mobile device was located at the indicated location), and a device ID parameter (e.g., indicating a particular device). By storing each location as an event, location history module 1614 can maintain a historical record of the location of a tracked device over a period of time.

In some embodiments, location history module 1614 is configured to use the location history for a tracked device to reconstruct a route that the tracked device travels within the building. For example, location history module 1614 can use the location history for a tracked device assigned to security personnel to determine whether the security personnel have physically traveled to various locations within the building at the appropriate times (e.g., for performing security checks, for personnel management, for responding to emergencies, etc.). As another example, the location history for a tracked device can allow a user's route from one building zone to another building zone to be reconstructed. This feature can be useful for providing navigation instructions (e.g., directions from one room in the building to another, directions to a tracked device, etc.) for situations in which a user is not familiar with a layout of the building. The location history for a tracked device can also be used in the event of an emergency (e.g., a fire or fire drill) to determine whether all users who entered the building on a particular day (e.g., the day of the emergency) have been safely evacuated.

Still referring to FIG. 16, targeted alert system 502 is shown to include a user determination module 1620. User determination module 1620 can be configured to identify a user associated with a tracked device. The user associated with the tracked device may be, for example, a user of a tracked mobile device. In some embodiments, the tracked devices report a device identifier (e.g., a MAC address, an IP address, a device name, etc.) and/or user identifier (e.g., a user name, a login ID, a user group, etc.) to targeted alert system 502. User determination module 1620 can use the device identifier and/or user identifier to identify a particular user or user account associated with the tracked device.

Different users can have different access permissions and/or privileges for viewing or responding to alerts. For example, a system administrator or service technician may be authorized view equipment maintenance alerts whereas other users may not have such access. The identity of the user associated with the tracked device can be used to select a set of alerts to provide to the mobile device.

In some embodiments, the user identity determined by user determination module 1620 can be used to automatically adjust control parameters for the corresponding building zone (e.g., the zone in which the user is located). For example, a user's identity can be used to identify the user's preferred environment conditions (e.g., temperature conditions, air flow conditions, etc.) for a building zone. When the user enters a building zone, the identity of the user can be used to automatically adjust control setpoints (e.g., temperature setpoints, flow rate setpoints, etc.) for the building zone to the user's preferred values. In some embodiments, if two or more users with conflicting preferences are located within the same building zone, the user identities determined by user determination module 1620 can be used to select one set of preferred control parameters over another (e.g., based on user authority levels, based on which user is higher ranking in an organization, etc.).

In some embodiments, the user identity determined by user determination module 1620 can be used to provide the user with a set of alerts customized to the user's role. For example, a user identified as a security guard can be provided with customized alerts related to building security, whereas a user identified as a maintenance worker can be provided with a customized set of alerts related to equipment maintenance. In the event of an emergency, the user identity can be used to determine whether the user has special skills that can assist with the emergency (e.g., first aid training, CPR training, etc.).

Still referring to FIG. 16, targeted alert system 502 is shown to include an architectural building modeler 1616. Architectural building modeler 1616 can be configured to generate or obtain a three-dimensional architectural model of the building. The architectural building model may specify the physical structures and dimensions of the building (e.g., interior and exterior wall locations, window locations, stair/elevator locations, room dimensions, etc.). In some embodiments, architectural building modeler 1616 uses existing blueprints or floor plans for the building to generate the architectural building model. For example, architectural building modeler 1616 can receive a scanned or imported image of a blueprint or floor plan. Architectural building modeler 1616 can analyze the blueprints or floor plans to generate a three-dimensional model of the building. In other embodiments, architectural building modeler 1616 imports the three-dimensional model from a CAD file (e.g., .dxf drawings) or drawing generated by architecture software or design software.

In some embodiments, architectural building modeler 1616 can be used to create a new architectural building model (e.g., generating a new model based on user input). For example, a user may interact with architectural building modeler 1616 to specify building dimensions (e.g., overall building dimensions, room dimensions, wall locations, etc.) and other physical or architectural attributes of the building.

In some embodiments, architectural building modeler 1616 generates a new architectural building model based on optical imaging or other automated measurements of the building. For example, a mobile device can be used to measure wall locations and other physical structures (e.g., door locations, ceiling heights, stair locations, etc.) within the building using any of a variety of positioning or ranging techniques (e.g., optical sensing, radar, sonar, lidar, etc.). The location of the tracked device can be determined using any of the methods described above with reference to location determination module 1612.

The tracked device can report location information (e.g., GPS coordinates, accelerometer data, altitude data, etc.), orientation information (e.g., a direction that the mobile device is facing) and structure detection information to architectural building modeler 1616 at multiple different locations within the building. Architectural building modeler 1616 can generate a three-dimensional building model based on the location/orientation of the mobile device and the measured distances to various structures within the building at each of a plurality of measurement locations. Architectural building modeler 1616 can store the architectural building model in a database.

Still referring to FIG. 16, targeted alert system 502 is shown to include a location integration module 1618. Location integration module 1618 can be configured to integrate (e.g., apply, combine, merge, etc.) the architectural building model provided by architectural building modeler 1616 with the tracked device location information provided by location determination module 1612. For example, the location information provided by location determination module 1612 can define the locations of tracked devices as points floating in three-dimensional space. Location integration module 1618 can apply the locations of the tracked devices to the architectural building model to map each three-dimensional location to a particular location within the building.

In some embodiments, the tracked device location information defines the locations of the tracked devices according to a first coordinate system and the architectural model defines the architecture of the building according to a second coordinate system. Location integration module 1618 can merge the first coordinate system with the second coordinate system to generate an integrated model that includes both a three-dimensional architectural representation of the building and the locations of various tracked devices.

In some embodiments, location integration module 1618 receives calibration data. The calibration data can identify a point in the building architectural model (e.g., a three-dimensional location) that corresponds to a particular point relative to the locations of the tracked devices (i.e., a shared point between the first coordinate system and the second coordinate system). The calibration data can include multiple calibration points measured at various locations in or around the building (e.g., a location measured at a southwest corner of the building, a location measured at a northeast corner of the building, etc.). Location integration module 1618 can use the calibration data to scale and/or orient the building architectural model relative to the floating points representing the three-dimensional locations of various tracked devices. Location integration module 1618 can generate an integrated building model (e.g., a three-dimensional architectural model) that defines the architecture of the building and specifies the locations of tracked devices relative to the architecture of the building (e.g., within a wall, in a particular room or zone, on the roof, etc.).

Still referring to FIG. 16, targeted alert system 502 is shown to include a model visualization module 1624. Model visualization module 1624 can be configured to generate or provide a graphical user interface (GUI) for visualizing the integrated model generated by location integration module 1618. Model visualization module 1624 can generate a GUI that includes a three-dimensional architectural model of the building with the locations of various tracked devices represented visually in the three-dimensional architectural model. The location of each tracked device can be shown relative to the architecture of the building.

In some embodiments, model visualization module 1624 represents tracked devices using three-dimensional objects in the graphical visualization. For example, model visualization module 1624 cam access the device identifiers stored in locations database 512 to identify a type of device located at each of the indicated locations in the integrated model. Model visualization module 1624 can retrieve three-dimensional representations of one or more device types (e.g., a CAD model of a chiller, a CAD model of an AHU, etc.) and insert the three-dimensional representations at the specified locations in the integrated model. For example, model visualization module 1624 can represent a chiller in the graphical visualization using a three-dimensional model of a chiller positioned at the location in the building associated with the chiller. Similarly, model visualization module 1624 can retrieve photos or other information for users in the room and insert the photos into the three-dimensional model.

Still referring to FIG. 16, targeted alert system 502 is shown to include a targeted alerts module 1622. Targeted alerts module 1622 can be configured to provide notifications (e.g., messages, alerts, information, etc.) to tracked devices based on the locations of the tracked devices and/or the roles associated with users of the tracked devices. For example, if a hazardous condition (e.g., a fire, a chemical spill, a security event, etc.) is detected in the building, targeted alerts module 1622 can send a notification to users that may be affected by the hazardous condition based on the location of the users. The notification can include, for example, evacuation instructions, response instructions, or other instructions for handling the hazardous condition.

Targeted alerts module 1622 can receive device location information from location determination module 1612 and/or user identity information from user determination module 1620. Targeted alerts module 1622 can generate and/or distribute customized notifications to tracked devices based on the locations of tracked devices and/or the identities of users associated with the tracked devices (e.g., based on the users' role). For example, if a security event is detected in the building (e.g., an unauthorized entry), targeted alerts module 1622 can send a customized notification to security personnel with specific instructions for handling the security event. The instructions provided to tracked devices associated with security personnel can be based on the locations of the tracked devices with respect to the security event. For example, security personnel located close to the event may receive a first set of instructions, whereas security personnel located further from the event may receive a second set of instructions. Additionally, the instructions provided to tracked devices associated with security personnel may be different than the instructions provided to tracked devices associated with other building occupants.

Still referring to FIG. 16, targeted alert system 502 is shown to include a building navigation module 1626. Building navigation module 1626 can be configured to generate navigation information for a tracked device based on the location of the tracked device within the building. For example, building navigation module 1626 can generate display data for presentation on a mobile device which includes a map of the building. Building navigation module 1626 can receive location information from the location determination module and use the location information to mark the location of the tracked device on the map. Advantageously, the information generated by building navigation module 1626 cab facilitate intra-building navigation of the building (e.g., navigation between rooms or zones of a building).

In some embodiments, building navigation module 1626 generates navigation instructions. For example, building navigation module 1626 can generate directions for traveling from one room or zone of the building to another room or zone of the building. The directions generated by building navigation module 1626 can be similar to driving directions generated by a GPS navigation unit. However, the directions generated by building navigation module 1626 can be based on the layout of the building and the location of tracked devices with respect to wireless emitters. This feature may be useful for facilitating navigation within the building for users who are not familiar with a layout of the building.

In some embodiments, building navigation module 1626 generates a user interface for presentation on a mobile device which includes a highlighted route from a current location of the mobile device (e.g., determined by the location determination module) to a destination location (e.g., provided or selected by a user). The destination location can be selected from a list of previous locations of the mobile device or can be provided by a user. For example, a user can select or input the name or number of a particular room or zone of the building into a mobile device. Building navigation module 1626 can use the current location of the mobile device to generate navigation instructions (e.g., step-by-step instructions, a highlighted route, an interactive map, etc.) for traveling from the current location of the mobile device to the destination location provided and/or selected by the user.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for distributing targeted alerts to building occupants, the system comprising:
   building equipment configured to detect an event within a building and generate an alert identifying the event; and
   a targeted alert system configured to:
   receive the alert from the building equipment;
   identify a location within the building at which the event occurs;
   identify a location within the building of each of a plurality of building occupants based on location information measured by mobile devices carried by the building occupants;
   determine a location trajectory of each of the mobile devices carried by the building occupants, each location trajectory comprising a future location of one of the mobile devices carried by the building occupants;
   identify one or more of the building occupants moving toward the location within the building at which the event occurs based on the location trajectories of each of the mobile devices carried by the building occupants;
   identify a role performed by each of the building occupants;
   select one or more of the building occupants identified as moving toward the location within the building at which the event occurs to receive the alert based on the role performed by each of the building occupants; and
   distribute the alert to the one or more selected building occupants.

2. The system of claim 1, further comprising a locations database configured to store location information indicating the location within the building of each of the building occupants;
   wherein the targeted alert system is configured to identify the location within the building of each of the building occupants by accessing the location information in the locations database.

3. The system of claim 1, further comprising a roles database configured to store role information indicating the role performed by each of the building occupants;
   wherein the targeted alert system is configured to identify the role performed by each of the building occupants by accessing the role information in the roles database.

4. The system of claim 1, wherein the targeted alert system is configured to select the one or more building occupants to receive the alert by:
   identifying one or more roles associated with the event; and
   selecting one or more of the building occupants that perform the identified one or more roles.

5. The system of claim 1, wherein the targeted alert system is configured to select the one or more building occupants to receive the alert by: selecting one or more of the building occupants based on a distance between the location within the building at which the event occurs and the location within the building of each of the building occupants.

6. The system of claim 1, wherein the targeted alert system is configured to select the one or more building occupants to receive the alert by:
   identifying one or more of the building occupants having a role associated with responding to the event;
   determining a distance between the location within the building at which the event occurs and the location within the building of each of the one or more identified building occupants; and
   selecting one of the one or more identified building occupants that has a minimum distance between the location within the building at which the event occurs and the location within the building of the one of the one or more identified building occupants.

7. The system of claim 1, wherein the targeted alert system is configured to select the one or more building occupants to receive the alert by:
determining a location of the building equipment;
determining a distance between the location of the building equipment and the location within the building of each of the one or more identified building occupants; and
selecting one or more of the one or more building occupants within a threshold distance of the location of the building equipment.

8. The system of claim 1, further comprising a plurality of wireless emitters, each of the wireless emitters having a known location within the building;
wherein the targeted alert system is configured to determine the location within the building of each of the building occupants based on which of the wireless emitters are detected by one of the mobile devices carried by one of the building occupants.

9. The system of claim 1, wherein the targeted alert system is configured to select the one or more building occupants to receive the alert by:
identifying one or more of the building occupants having a role associated with the event;
determining whether each of the one or more identified building occupants is located within the building; and
selecting the one or more identified building occupants that are determined to be located within the building.

10. A method for distributing targeted alerts to building occupants, the method comprising:
receiving an alert identifying an event within a building;
identifying a location within the building at which the event occurs;
identifying a location within the building of each of a plurality of building occupants based on location information measured by mobile devices carried by the building occupants;
determining a location trajectory of each of the mobile devices carried by the building occupants, each location trajectory comprising a future location of one of the mobile devices carried by the building occupants;
identifying one or more of the building occupants moving toward the location within the building at which the event occurs based on the location trajectory of each of the mobile devices carried by the building occupants;
identifying a role performed by each of the building occupants;
selecting one or more of the building occupants identified as moving toward the location within the building at which the event occurs to receive the alert based on the role performed by each of the building occupants; and
distributing the alert to the one or more selected building occupants.

11. The method of claim 10, further comprising storing location information within a locations database, the location information indicating the location within the building of each of the building occupants;
wherein identifying the location within the building of each of the building occupants comprises accessing the location information in the locations database.

12. The method of claim 10, further comprising storing role information within a roles database, the role information indicating the role performed by each of the building occupants;
wherein identifying the role performed by each of the building occupants comprises accessing the role information in the roles database.

13. The method of claim 10, wherein selecting the one or more building occupants to receive the alert comprises:
identifying one or more roles associated with the event; and
selecting one or more of the building occupants that perform the one or more identified roles.

14. The method of claim 10, wherein selecting the one or more building occupants to receive the alert comprises:
selecting one or more of the building occupants based on a distance between the location within the building at which the event occurs and the location within the building of each of the building occupants.

15. The method of claim 10, wherein selecting the one or more building occupants to receive the alert comprises:
identifying one or more of the building occupants having a role associated with responding to the event;
determining a distance between the location within the building at which the event occurs and the location within the building of each of the one or more identified building occupant; and
selecting one of the one or more identified building occupants that has a minimum distance between the location within the building at which the event occurs and the location within the building of the one of the one or more identified building occupants.

16. The method of claim 10, wherein selecting the one or more building occupants to receive the alert comprises:
determining a location of the building equipment;
determining a distance between the location of the building equipment and the location within the building of each of the one or more identified building occupants; and
selecting one or more of the building occupants within a threshold distance of the location of the building equipment.

17. The method of claim 10, wherein selecting the one or more building occupants to receive the alert comprises:
identifying one or more of the building occupants having a role associated with the event;
determining whether each of the one or more identified building occupants is located within the building; and
selecting one or more of the one or more identified building occupants that are determined to be located within the building.

18. The method of claim 11, further comprising:
identifying a location of each of a plurality of wireless emitters within the building; and
determining the location within the building of each of the building occupants based on which of the wireless emitters are detected by one of the mobile devices carried by one of the building occupants.

* * * * *